US012620252B2

(12) United States Patent (10) Patent No.: US 12,620,252 B2
Krishnan et al. (45) Date of Patent: May 5, 2026

(54) INFORMATION SOURCE DETECTION USING UNIQUE WATERMARKS

(71) Applicant: EchoMark, Inc., Kirkland, WA (US)

(72) Inventors: Sanjay Krishnan, Hinsdale, IL (US); David Wong, Los Gatos, CA (US); Chad Voss, Seattle, WA (US); Troy Batterberry, Kirkland, WA (US); Clayton Huthwaite, Chesterfield, VA (US); Colin Saunders, San Francisco, CA (US); Stephen Bianamara, Seattle, WA (US); Parker Beck, Kenmore, WA (US)

(73) Assignee: EchoMark, Inc., Kirkland, WA (US)

( * ) Notice: Subject to any disclaimer, the term of this patent is extended or adjusted under 35 U.S.C. 154(b) by 348 days.

(21) Appl. No.: 18/179,635

(22) Filed: Mar. 7, 2023

(65) Prior Publication Data

US 2024/0304018 A1 Sep. 12, 2024

(51) Int. Cl.
*G06V 30/418* (2022.01)
*G06V 10/75* (2022.01)

(52) U.S. Cl.
CPC .......... *G06V 30/418* (2022.01); *G06V 10/751* (2022.01)

(58) Field of Classification Search
None
See application file for complete search history.

(56) References Cited

U.S. PATENT DOCUMENTS 6,044,464 A * 3/2000 Shamir ................... G06F 21/10
380/255
6,381,367 B1 * 4/2002 Ryan ..................... G06T 1/0057
382/116

| 6,397,205 | B1 | 5/2002 | Juola |
| 6,879,701 | B1 | 4/2005 | Rhoads |
| 7,814,078 | B1 | 10/2010 | Forman et al. |
| 7,958,136 | B1 | 6/2011 | Curtis et al. |
| 8,335,789 | B2 | 12/2012 | Hull et al. |

(Continued)

FOREIGN PATENT DOCUMENTS

JP 2015136027 A * 7/2015

OTHER PUBLICATIONS

Machine Translation JP 2015136027 A (Year: 2015).*

(Continued)

*Primary Examiner* — Michelle M Entezari Hausmann

(74) *Attorney, Agent, or Firm* — Shook, Hardy & Bacon L.L.P.

(57) ABSTRACT

Document source detection uses unique copies to identify sources of leaked documents. The unique copies are generated from an original document and include a unique watermarking of one or more perturbations to a feature of the original document. An artifact, such as a photo or copy, is derived from one of the unique copies, the unique copy from which it was derived is identified. To identify the unique copy, unique copy keypoints in the unique copies are matched to artifact keypoints in the artifact to align the artifact with a location within the unique documents. Pixel regions in the unique copies that include perturbations are used to identify corresponding pixel regions in the artifact. Pixels in these regions are compared to identify the unique copy from which the artifact was derived, thus identifying a possible source of the leaked document.

20 Claims, 17 Drawing Sheets

(56) References Cited

U.S. PATENT DOCUMENTS

| 8,799,236 | B1 | 8/2014 | Azari et al. | |
| 8,914,338 | B1 | 12/2014 | Wallace et al. | |
| 9,805,099 | B2 | 10/2017 | Cohen | |
| 9,971,594 | B2 | 5/2018 | Fox et al. | |
| 10,452,781 | B2 | 10/2019 | Verma | |
| 11,120,520 | B2 | 9/2021 | Voynov et al. | |
| 11,341,761 | B2 | 5/2022 | Evans et al. | |
| 11,468,694 | B1 | 10/2022 | Al-Gharaibeh et al. | |
| 11,593,439 | B1 | 2/2023 | Avadhani et al. | |
| 11,763,564 | B1 | 9/2023 | Sadoughi et al. | |
| 11,995,215 | B2 | 5/2024 | De et al. | |
| 12,124,518 | B1 | 10/2024 | Wang et al. | |
| 12,158,929 | B1 | 12/2024 | Huang et al. | |
| 12,164,664 | B1 | 12/2024 | Dupont et al. | |
| 12,326,959 | B2* | 6/2025 | Dhouib | G06F 21/16 |
| 12,348,692 | B2 | 7/2025 | Picard | |
| 12,400,469 | B1 | 8/2025 | De et al. | |
| 2003/0009670 | A1 | 1/2003 | Rhoads | |
| 2004/0243602 | A1 | 12/2004 | Shiiyama | |
| 2004/0263911 | A1 | 12/2004 | Rodriguez et al. | |
| 2005/0154892 | A1 | 7/2005 | Mihcak et al. | |
| 2006/0048237 | A1 | 3/2006 | Luo et al. | |
| 2006/0122983 | A1 | 6/2006 | King et al. | |
| 2007/0260651 | A1 | 11/2007 | Pedersen | |
| 2008/0109362 | A1 | 5/2008 | Fransdonk | |
| 2008/0158588 | A1 | 7/2008 | Haas et al. | |
| 2008/0178302 | A1 | 7/2008 | Brock et al. | |
| 2008/0313172 | A1 | 12/2008 | King et al. | |
| 2009/0089754 | A1 | 4/2009 | Zeidman | |
| 2009/0125607 | A1 | 5/2009 | Rhoads | |
| 2009/0324100 | A1 | 12/2009 | Kletter et al. | |
| 2010/0037059 | A1 | 2/2010 | Sun et al. | |
| 2010/0220364 | A1 | 9/2010 | Picard et al. | |
| 2012/0093421 | A1 | 4/2012 | Kletter | |
| 2012/0197952 | A1 | 8/2012 | Srinivasaraghavan | |
| 2014/0137238 | A1 | 5/2014 | Brdiczka et al. | |
| 2014/0164352 | A1 | 6/2014 | Denninghoff | |
| 2015/0033120 | A1 | 1/2015 | Cooke et al. | |
| 2015/0169708 | A1 | 6/2015 | Song et al. | |
| 2018/0032811 | A1 | 2/2018 | Yellapragada et al. | |
| 2018/0157939 | A1 | 6/2018 | Butt et al. | |
| 2018/0260389 | A1 | 9/2018 | Bahrami et al. | |
| 2018/0341701 | A1 | 11/2018 | Verma et al. | |
| 2019/0138867 | A1* | 5/2019 | Vander Aa | G06K 19/0614 |
| 2019/0243821 | A1 | 8/2019 | Duhamel et al. | |
| 2020/0162236 | A1* | 5/2020 | Miller | G06F 40/174 |
| 2020/0184212 | A1* | 6/2020 | Anthony Samy | G06N 20/20 |
| 2020/0244459 | A1* | 7/2020 | Hu | G06T 1/005 |
| 2021/0004582 | A1 | 1/2021 | Evans et al. | |
| 2021/0004583 | A1 | 1/2021 | Evans et al. | |
| 2021/0192204 | A1 | 6/2021 | Van et al. | |
| 2021/0357482 | A1 | 11/2021 | Devir et al. | |
| 2021/0406225 | A1 | 12/2021 | Akhoury et al. | |
| 2022/0366061 | A1* | 11/2022 | Spivack | H04L 9/3271 |
| 2022/0393875 | A1 | 12/2022 | Shrinivasan et al. | |
| 2023/0117399 | A1* | 4/2023 | Jakobsson | G06Q 50/184 |
| | | | | 705/310 |
| 2023/0237767 | A1 | 7/2023 | Su et al. | |
| 2024/0098345 | A1* | 3/2024 | Kang | G06V 10/44 |
| 2024/0161463 | A1 | 5/2024 | Rasheed et al. | |
| 2024/0161521 | A1 | 5/2024 | Rasheed et al. | |
| 2024/0205349 | A1 | 6/2024 | Picard | |
| 2024/0232509 | A9 | 7/2024 | Wolkoff et al. | |
| 2024/0289550 | A1 | 8/2024 | Wu | |
| 2025/0165536 | A1 | 5/2025 | Wang et al. | |
| 2025/0181650 | A1 | 6/2025 | Wang et al. | |
| 2025/0231992 | A1 | 7/2025 | Wang et al. | |

OTHER PUBLICATIONS

Benedens, Oliver. "Robust watermarking and affine registration of 3d meshes." International Workshop on Information Hiding. Berlin, Heidelberg: Springer Berlin Heidelberg, 2002. (Year: 2002).*

Mandreoli, Federica, Riccardo Martoglia, and Paolo Tiberio. "A document comparison scheme for secure duplicate detection." International Journal on Digital Libraries 4.3 (2004): 223-244. (Year: 2004).*

Garg, Pulkit, et al. "Identifying the Leak Sources of Hard Copy Documents." IFIP International Conference on Digital Forensics. Cham: Springer International Publishing, 2022. (Year: 2022).*

Nayak, Jijnasa, et al. "Detecting data leakage from hard copy documents." IFIP International Conference on Digital Forensics. Cham: Springer International Publishing, 2018. (Year: 2018).*

Chandrasekaran, Madhusudhanan, Vidyaraman Sankaranarayanan, and Shambhu Upadhyaya. "Inferring sources of leaks in document management systems." IFIP International Conference on Digital Forensics. Boston, MA: Springer US, 2008. (Year: 2008).*

Nikita Mazurov, "Beware of "Watermarking" If You Leak from Elon Musk's Twitter", The Intercept, Dec. 15, 2022 (11 pages).

J. T. Brassil et al., "Electronic Marking and Identification Techniques to Discourage Document Copying", IEEE Journal on Selected Areas in Communications, vol. 13, No. 8, Oct. 1995 (10 pages).

C. Xiao et al., "FontCode: Embedding Information in Text Documents using Glyph Perturbation", ACM Transactions on Graphics, vol. 1, No. 1, Article 1, Dec. 2017 (16 pages).

Apryse Software Inc., "Comprehensive document processing tools", Accessed May 8, 2023, https://apryse.com/ (10 pages).

Opencv, "Shi-Tomasi Corner Detector & Good Features to Track", Accessed May 8, 2023, https://docs.opencv.org/3.4/d4/d8c/tutorial_py_shi_tomasi.html (2 pages).

Apryse Software Inc., "Extracting text from PDF documents using JavaScript", Accessed May 8, 2023, https://docs.apryse.com/documentation/web/guides/extraction/text-extract/ (15 pages).

Apryse Software Inc., "Extracting images from a PDF using JavaScript", Accessed May 8, 2023, https://docs.apryse.com/documentation/web/guides/extraction/image-extract/ (6 pages).

Text, "pdf2Data an iText 7 add-on", Accessed May 8, 2023, https://itextpdf.com/sites/default/files/2018-10/Whitepaper_pdf2Data_2017.pdf (9 pages).

OpenCV, "Template Matching", Accessed May 8, 2023, https://docs.opencv.org/4.x/d4/dc6/tutorial_py_template_matching.html (4 pages).

Abdibayev et al., "Using Word Embedding to Deter Intellectual Property Theft through Automated Generation of Fake Documents", ACM Transactions on Management Information Systems, vol. 12, No. 2, Article 13, Jan. 2021 (22 pages).

Ahmed Alsayat, "Improving Sentiment Analysis for Social Media Applications Using an Ensemble Deep Learning Language Model", Arabian Journal for Science and Engineering (2022) 47:2499-2511 (13 pages).

Lakshmipathi N, "Imdb Dataset of 50K Movie Reviews", https://www.kaggle.com/datasets/lakshmi25npathi/imdb-dataset-of-50k-movie-reviews (accessed May 8, 2023).

Liu et al., "PEGASUS: AState-of-the-Art Model for Abstractive Text Summarization", Google Research, Jun. 9, 2020 (7 pages).

Alzahrani et al., "Understanding Plagiarism Linguistic Patterns, Textual Features, and Detection Methods", IEEE Transactions on Systems, Man, and Cybernetics, Part C, vol. 42, No. 2, Mar. 2012, pp. 133-149.

Coates et al., "Identifying Document Similarity Using a Fast Estimation of the Levenshtein Distance Based on Compression and Signatures", Available online at: <https://arxiv.org/abs/2307.11496>, Jul. 21, 2023, pp. 1-11.

D'Amore et al., "Traitor-Proof PDF Watermarking", Available online at: <https://arxiv.org/abs/2307.11496>, Sep. 20, 2021, pp. 1-23.

Elhadi et al., "Webpage Duplicate Detection Using Combined POS and Sequence Alignment Algorithm", 2009 World Congress on Computer Science and Information Engineering, Mar. 2009, pp. 630-634.

Meuschke et al., "Improving Academic Plagiarism Detection for STEM Documents by Analyzing Mathematical Content and Citations", 2019 ACM/IEEE Joint Conference on Digital Libraries (JCDL), Jun. 2019, pp. 120-129.

Molina, et al., "Fast Approximate Matching of Programs for Protecting Libre/Open Source Software by Using Spatial Indexes",

(56)            References Cited

OTHER PUBLICATIONS

Seventh IEEE International Workimg Conference on Source Code Analysis and Manipulation, Sep. 2007, pp. 111-120.
Non-Final Office Action received for U.S. Appl. No. 18/592,118, mailed on Mar. 11, 2026, 6 pages.
Raju et al., "Video Copy Detection in Distributed Environment" 2016 IEEE Second International Conference on Multimedia Big Data (BigMM), Apr. 2016, pp. 432-435.
Rakthanmanon et al., "Mining Historical Documents for Near-Duplicate Figures", 2011 IEEE 11th International Conference on Data Mining, Dec. 2011, pp. 557-566.

\* cited by examiner

Figure 4:
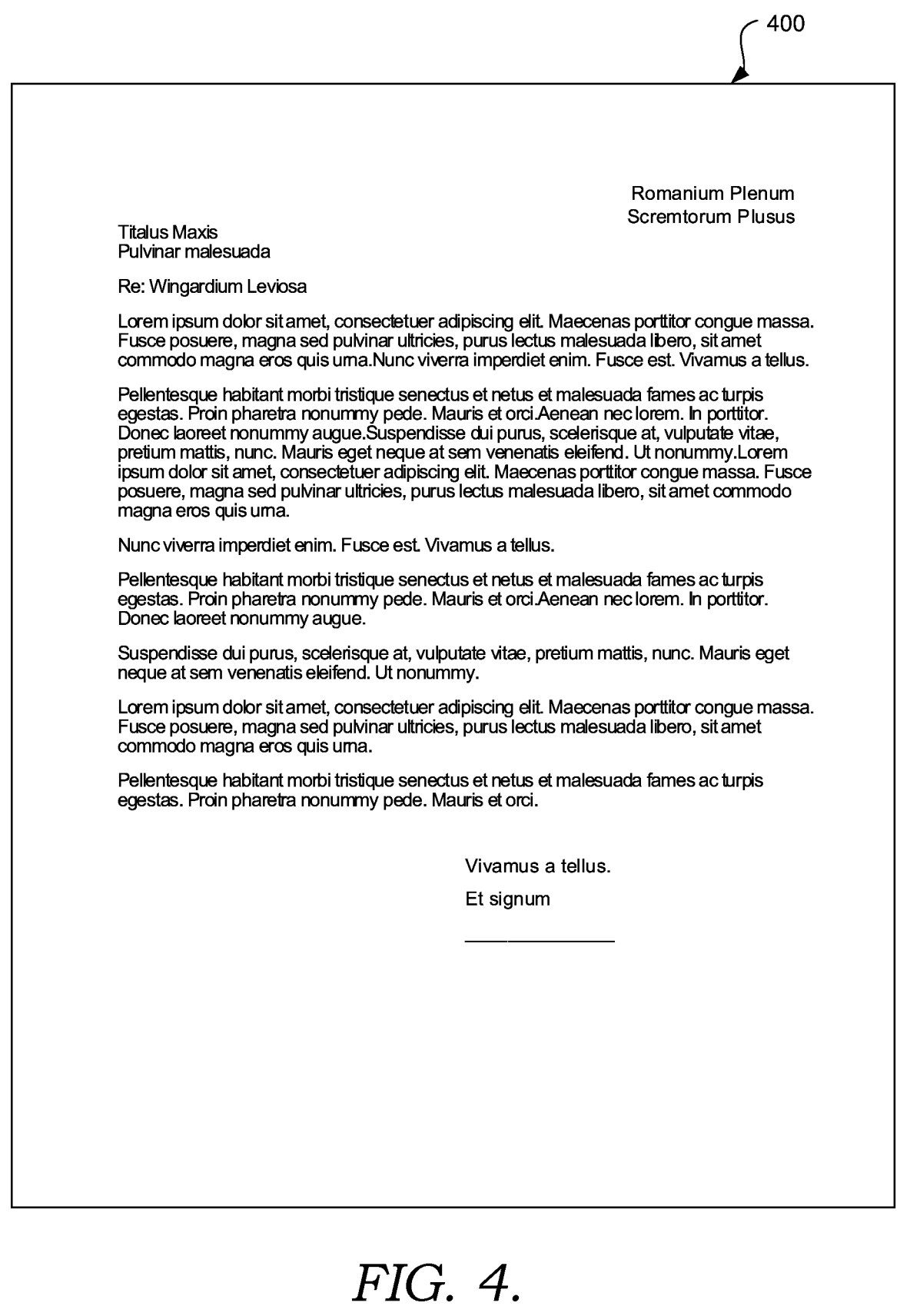

400

Romanium Plenum
Scremtorum Plusus

Titalus Maxis
Pulvinar malesuada

Re: Wingardium Leviosa

Lorem ipsum dolor sit amet, consectetuer adipiscing elit. Maecenas porttitor congue massa.
Fusce posuere, magna sed pulvinar ultricies, purus lectus malesuada libero, sit amet
commodo magna eros quis urna.Nunc viverra imperdiet enim. Fusce est. Vivamus a tellus.

Pellentesque habitant morbi tristique senectus et netus et malesuada fames ac turpis
egestas. Proin pharetra nonummy pede. Mauris et orci.Aenean nec lorem. In porttitor.
Donec laoreet nonummy augue.Suspendisse dui purus, scelerisque at, vulputate vitae,
pretium mattis, nunc. Mauris eget neque at sem venenatis eleifend. Ut nonummy.Lorem
ipsum dolor sit amet, consectetuer adipiscing elit. Maecenas porttitor congue massa. Fusce
posuere, magna sed pulvinar ultricies, purus lectus malesuada libero, sit amet commodo
magna eros quis urna.

Nunc viverra imperdiet enim. Fusce est. Vivamus a tellus.

Pellentesque habitant morbi tristique senectus et netus et malesuada fames ac turpis
egestas. Proin pharetra nonummy pede. Mauris et orci.Aenean nec lorem. In porttitor.
Donec laoreet nonummy augue.

Suspendisse dui purus, scelerisque at, vulputate vitae, pretium mattis, nunc. Mauris eget
neque at sem venenatis eleifend. Ut nonummy.

Lorem ipsum dolor sit amet, consectetuer adipiscing elit. Maecenas porttitor congue massa.
Fusce posuere, magna sed pulvinar ultricies, purus lectus malesuada libero, sit amet
commodo magna eros quis urna.

Pellentesque habitant morbi tristique senectus et netus et malesuada fames ac turpis
egestas. Proin pharetra nonummy pede. Mauris et orci.

Vivamus a tellus.

Et signum

500

Lorem ipsum dolor sit amet, consectetuer adipiscing elit. Maecenas por
Fusce posuere, magna sed pulvinar ultricies, purus lectus malesuada li
commodo magna eros quis urna.Nunc viverra imperdiet enim. Fusce e Pellentesque habitant morbi tristique senectus et netus et malesuada fa
egestas. Proin pharetra nonummy pede. Mauris et orci.Aenean nec lore
Donec laoreet nonummy augue.Suspendisse dui purus, scelerisque at,
pretium mattis, nunc. Mauris eget neque at sem venenatis eleifend. Ut r
ipsum dolor sit amet, consectetuer adipiscing elit. Maecenas porttitor co
posuere, magna sed pulvinar ultricies, purus lectus malesuada libero, s
magna eros quis urna.

Nunc viverra imperdiet enim. Fusce est. Vivamus a tellus.

Pellentesque habitant morbi tristique senectus et netus et malesuada fa
egestas. Proin pharetra nonummy pede. Mauris et orci.Aenean nec lore
Donec laoreet nonummy augue.

Suspendisse dui purus, scelerisque at, vulputate vitae, pretium mattis, r
neque at sem venenatis eleifend. Ut nonummy Lorem ipsum dolor sit amet, consectetuer adipiscing elit. Maecenas por
Fusce posuere, magna sed pulvinar ultricies, purus lectus malesuada li
commodo magna eros quis urna.

Pellentesque habitant morbi tristique senectus et netus et malesuada fa
egestas. Proin pharetra nonummy pede. Mauris et orci.

Computer Display Device

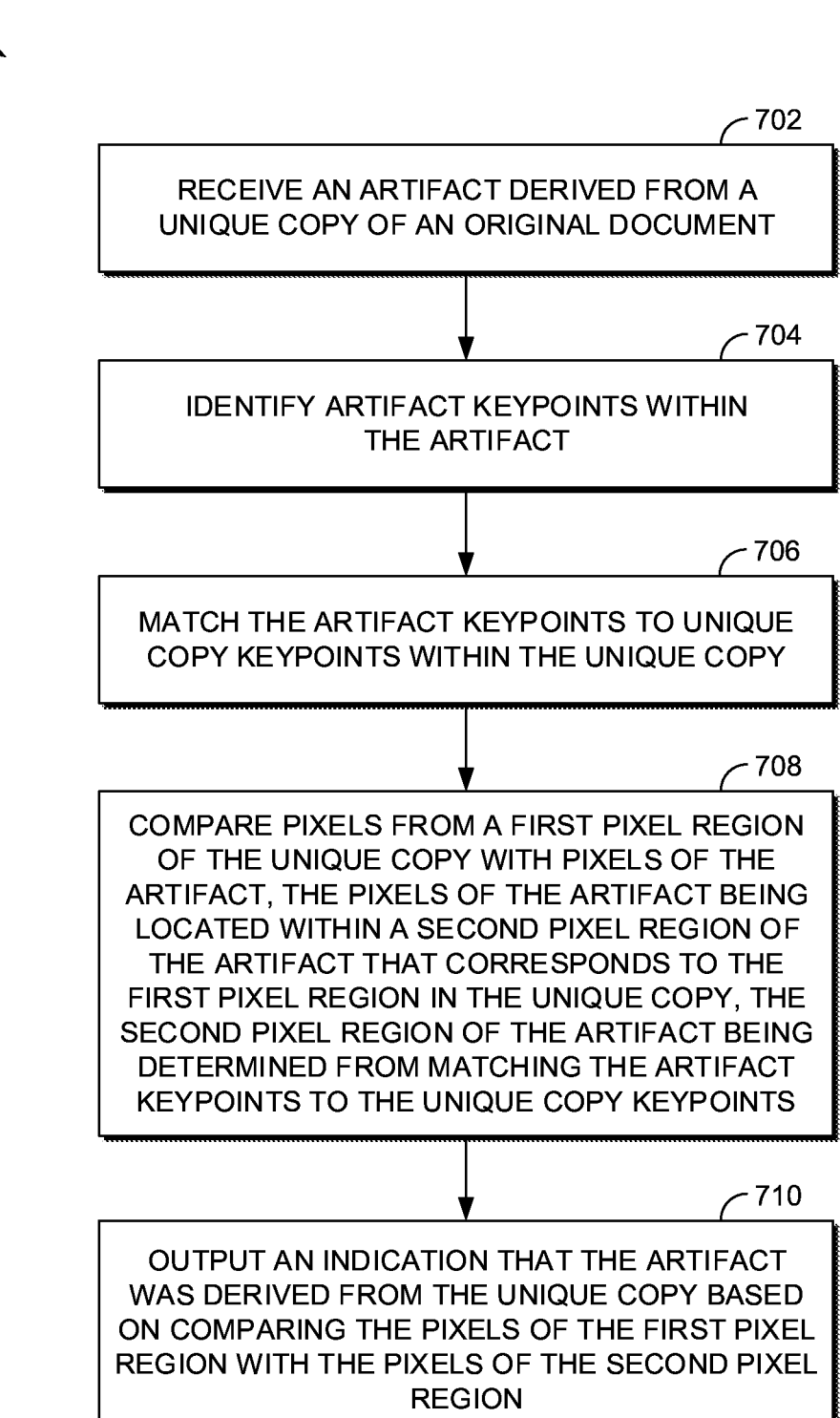

702

RECEIVE AN ARTIFACT DERIVED FROM A UNIQUE COPY OF AN ORIGINAL DOCUMENT

704

IDENTIFY ARTIFACT KEYPOINTS WITHIN THE ARTIFACT

706

MATCH THE ARTIFACT KEYPOINTS TO UNIQUE COPY KEYPOINTS WITHIN THE UNIQUE COPY

708

COMPARE PIXELS FROM A FIRST PIXEL REGION OF THE UNIQUE COPY WITH PIXELS OF THE ARTIFACT, THE PIXELS OF THE ARTIFACT BEING LOCATED WITHIN A SECOND PIXEL REGION OF THE ARTIFACT THAT CORRESPONDS TO THE FIRST PIXEL REGION IN THE UNIQUE COPY, THE SECOND PIXEL REGION OF THE ARTIFACT BEING DETERMINED FROM MATCHING THE ARTIFACT KEYPOINTS TO THE UNIQUE COPY KEYPOINTS

710

OUTPUT AN INDICATION THAT THE ARTIFACT WAS DERIVED FROM THE UNIQUE COPY BASED ON COMPARING THE PIXELS OF THE FIRST PIXEL REGION WITH THE PIXELS OF THE SECOND PIXEL REGION

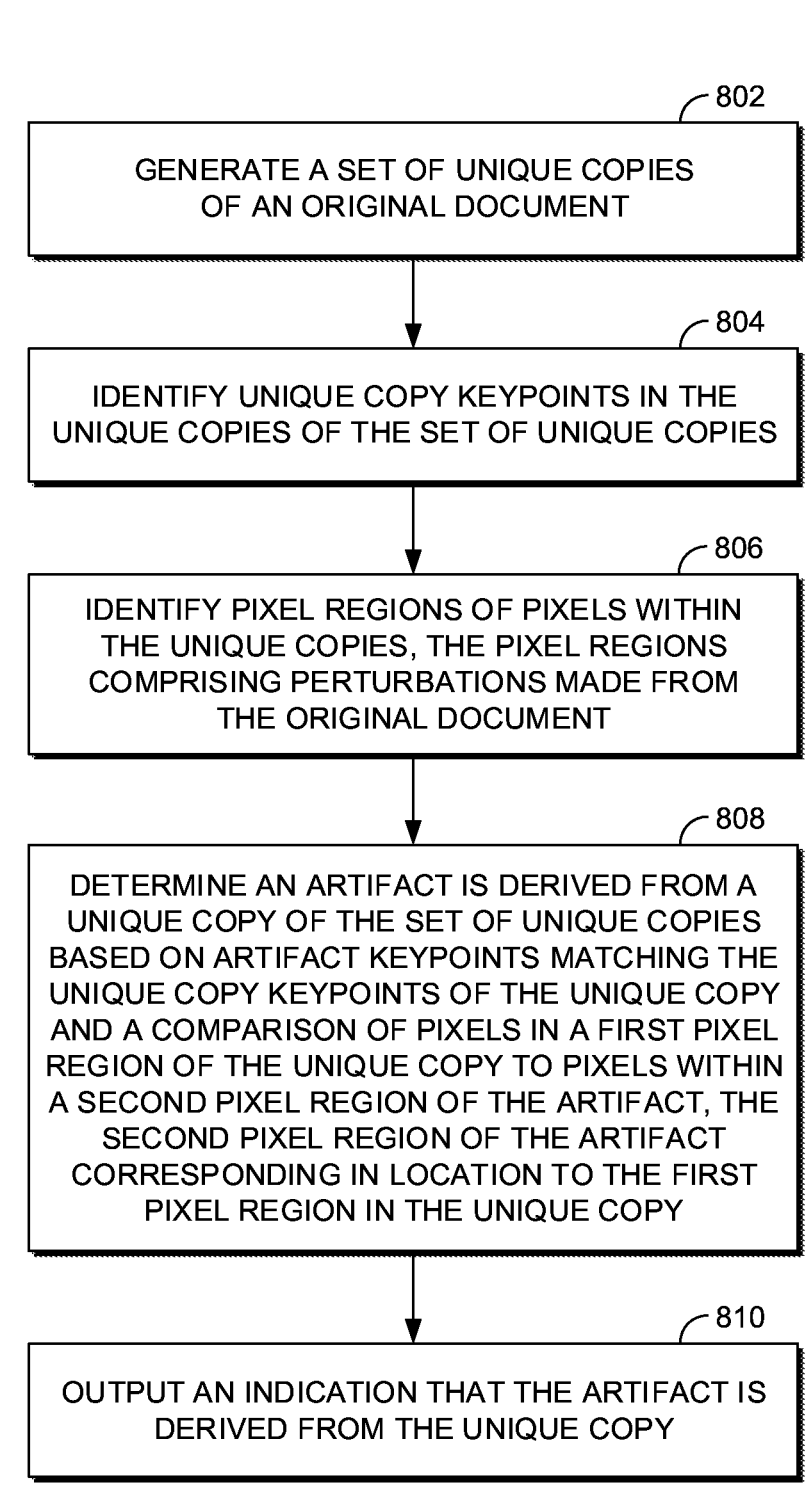

802

GENERATE A SET OF UNIQUE COPIES
OF AN ORIGINAL DOCUMENT

804

IDENTIFY UNIQUE COPY KEYPOINTS IN THE
UNIQUE COPIES OF THE SET OF UNIQUE COPIES

806

IDENTIFY PIXEL REGIONS OF PIXELS WITHIN
THE UNIQUE COPIES, THE PIXEL REGIONS
COMPRISING PERTURBATIONS MADE FROM
THE ORIGINAL DOCUMENT

808

DETERMINE AN ARTIFACT IS DERIVED FROM A
UNIQUE COPY OF THE SET OF UNIQUE COPIES
BASED ON ARTIFACT KEYPOINTS MATCHING THE
UNIQUE COPY KEYPOINTS OF THE UNIQUE COPY
AND A COMPARISON OF PIXELS IN A FIRST PIXEL
REGION OF THE UNIQUE COPY TO PIXELS WITHIN
A SECOND PIXEL REGION OF THE ARTIFACT, THE
SECOND PIXEL REGION OF THE ARTIFACT
CORRESPONDING IN LOCATION TO THE FIRST
PIXEL REGION IN THE UNIQUE COPY

810

OUTPUT AN INDICATION THAT THE ARTIFACT IS
DERIVED FROM THE UNIQUE COPY

*FIG. 14.*

900

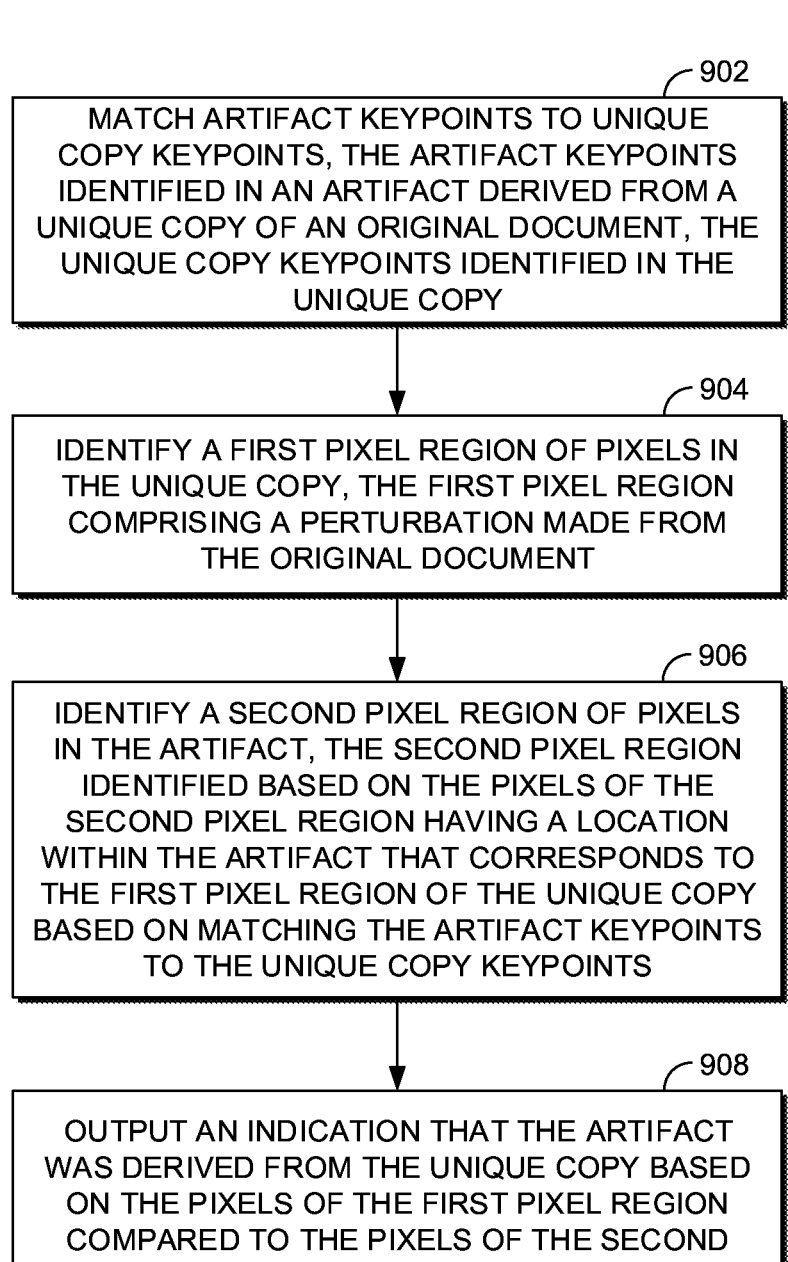

902

MATCH ARTIFACT KEYPOINTS TO UNIQUE COPY KEYPOINTS, THE ARTIFACT KEYPOINTS IDENTIFIED IN AN ARTIFACT DERIVED FROM A UNIQUE COPY OF AN ORIGINAL DOCUMENT, THE UNIQUE COPY KEYPOINTS IDENTIFIED IN THE UNIQUE COPY

904

IDENTIFY A FIRST PIXEL REGION OF PIXELS IN THE UNIQUE COPY, THE FIRST PIXEL REGION COMPRISING A PERTURBATION MADE FROM THE ORIGINAL DOCUMENT

906

IDENTIFY A SECOND PIXEL REGION OF PIXELS IN THE ARTIFACT, THE SECOND PIXEL REGION IDENTIFIED BASED ON THE PIXELS OF THE SECOND PIXEL REGION HAVING A LOCATION WITHIN THE ARTIFACT THAT CORRESPONDS TO THE FIRST PIXEL REGION OF THE UNIQUE COPY BASED ON MATCHING THE ARTIFACT KEYPOINTS TO THE UNIQUE COPY KEYPOINTS

908

OUTPUT AN INDICATION THAT THE ARTIFACT WAS DERIVED FROM THE UNIQUE COPY BASED ON THE PIXELS OF THE FIRST PIXEL REGION COMPARED TO THE PIXELS OF THE SECOND PIXEL REGION

| | |
|---|---|
| TM_SQDIFF<br>Python: cv.TM_SQDIFF | $R(x,y) = \sum_{x',y'} (T(x',y') - I(x+x',y+y'))^2$<br><br>with mask:<br><br>$R(x,y) = \sum_{x',y'} ((T(x',y') - I(x+x',y+y')) \cdot M(x',y'))^2$ |
| TM_SQDIFF_NORMED<br>Python: cv.TM_SQDIFF_NORMED | $R(x,y) = \dfrac{\sum_{x',y'}(T(x',y') - I(x+x',y+y'))^2}{\sqrt{\sum_{x',y'}T(x',y')^2 \cdot \sum_{x',y'}I(x+x',y+y')^2}}$<br><br>with mask:<br><br>$R(x,y) = \dfrac{\sum_{x',y'}((T(x',y') - I(x+x',y+y')) \cdot M(x',y'))^2}{\sqrt{\sum_{x',y'}(T(x',y') \cdot M(x',y'))^2 \cdot \sum_{x',y'}(I(x+x',y+y') \cdot M(x',y'))^2}}$ |
| TM_CCORR<br>Python: cv.TM_CCORR | $R(x,y) = \sum_{x',y'}(T(x',y') \cdot I(x+x',y+y'))$<br><br>with mask:<br><br>$R(x,y) = \sum_{x',y'}(T(x',y') \cdot I(x+x',y+y') \cdot M(x',y')^2)$ |
| TM_CCORR_NORMED<br>Python: cv.TM_CCORR_NORMED | $R(x,y) = \dfrac{\sum_{x',y'}(T(x',y') \cdot I(x+x',y+y'))}{\sqrt{\sum_{x',y'}T(x',y')^2 \cdot \sum_{x',y'}I(x+x',y+y')^2}}$<br><br>with mask:<br><br>$R(x,y) = \dfrac{\sum_{x',y'}(T(x',y') \cdot I(x+x',y+y') \cdot M(x',y')^2)}{\sqrt{\sum_{x',y'}(T(x',y') \cdot M(x',y'))^2 \cdot \sum_{x',y'}(I(x+x',y+y') \cdot M(x',y'))^2}}$ |
| TM_CCOEFF<br>Python: cv.TM_CCOEFF | $R(x,y) = \sum_{x',y'}(T'(x',y') \cdot I'(x+x',y+y'))$<br><br>where<br><br>$T'(x',y') = T(x',y') - 1/(w \cdot h) \cdot \sum_{x'',y''}T(x'',y'')$<br><br>$I'(x+x',y+y') = I(x+x',y+y') - 1/(w \cdot h) \cdot \sum_{x'',y''}T(x+x'',y+y'')$<br><br>with mask:<br><br>$T'(x',y') = M(x',y') \cdot \left( T(x',y') - \dfrac{1}{\sum_{x',y'}M(x'',y'')} \cdot \sum_{x'',y''}(T(x'',y'') \cdot M(x'',y'')) \right)$<br><br>$I'(x+x',y+y') = M(x',y') \cdot \left( I(x+x',y+y') - \dfrac{1}{\sum_{x',y'}M(x'',y'')} \cdot \sum_{x'',y''}(I(x+x'',y+y'') \cdot M(x'',y'')) \right)$ |
| TM_CCOEFF_NORMED<br>Python: cv.TM_CCOEFF_NORMED | $R(x,y) = \dfrac{\sum_{x',y'}(T'(x',y') \cdot I'(x+x',y+y'))}{\sqrt{\sum_{x',y'}T'(x',y')^2 \cdot \sum_{x',y'}I'(x+x',y+y')^2}}$ |

INFORMATION SOURCE DETECTION USING UNIQUE WATERMARKS

BACKGROUND

Organizations often create and distribute information. In some cases, this information may be harmful if leaked. Methods that identify the source of document leaks raise stewardship of information.

SUMMARY

At a high level, the technology relates to generating and detecting unique copies of original documents. More specifically, the technology relates to generating unique copies of original documents, and identifying which unique variation of the original was leaked. Initially, a set of unique copies of a document is generated from an original document. Each unique copy includes a watermarking of one or more perturbations to content in the original document. The unique copies are then individually distributed.

If one of the unique copies is leaked, then an artifact can be used to identify which unique copy from which the artifact was derived. The artifact may be any reproduction of the unique document, in whole or in part, such as a photo or print of the unique copy.

To determine the unique copy, the artifact is visually aligned with the unique copies to determine the location from which the artifact was derived. Artifact keypoints within the artifact are matched to unique copy keypoints in the unique copies to identify the alignment. Pixel regions of the unique copies that are known to have perturbations are compared to corresponding pixel regions in the artifact. The corresponding pixels and pixel region of the artifact used in the comparison are determined from the alignment. Based on the comparison in the pixel regions, the unique copy from which the artifact was derived is identified, which indicates a likely source of the leak.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 4 illustrates an example unique copy, in accordance with an aspect described herein;

FIG. 7 illustrates an example artifact derived from the unique copy of FIG. 4, in accordance with an aspect described herein;

FIGS. 13-15 are example methods for identifying a unique copy from which an artifact was derived, in accordance with aspects described herein;

FIG. 17 illustrates a table comprising example template matching operations suitable for use as example sub-image similarity metrics for comparing pixel regions, in accordance with an aspect described herein.

DETAILED DESCRIPTION

Figure 1:
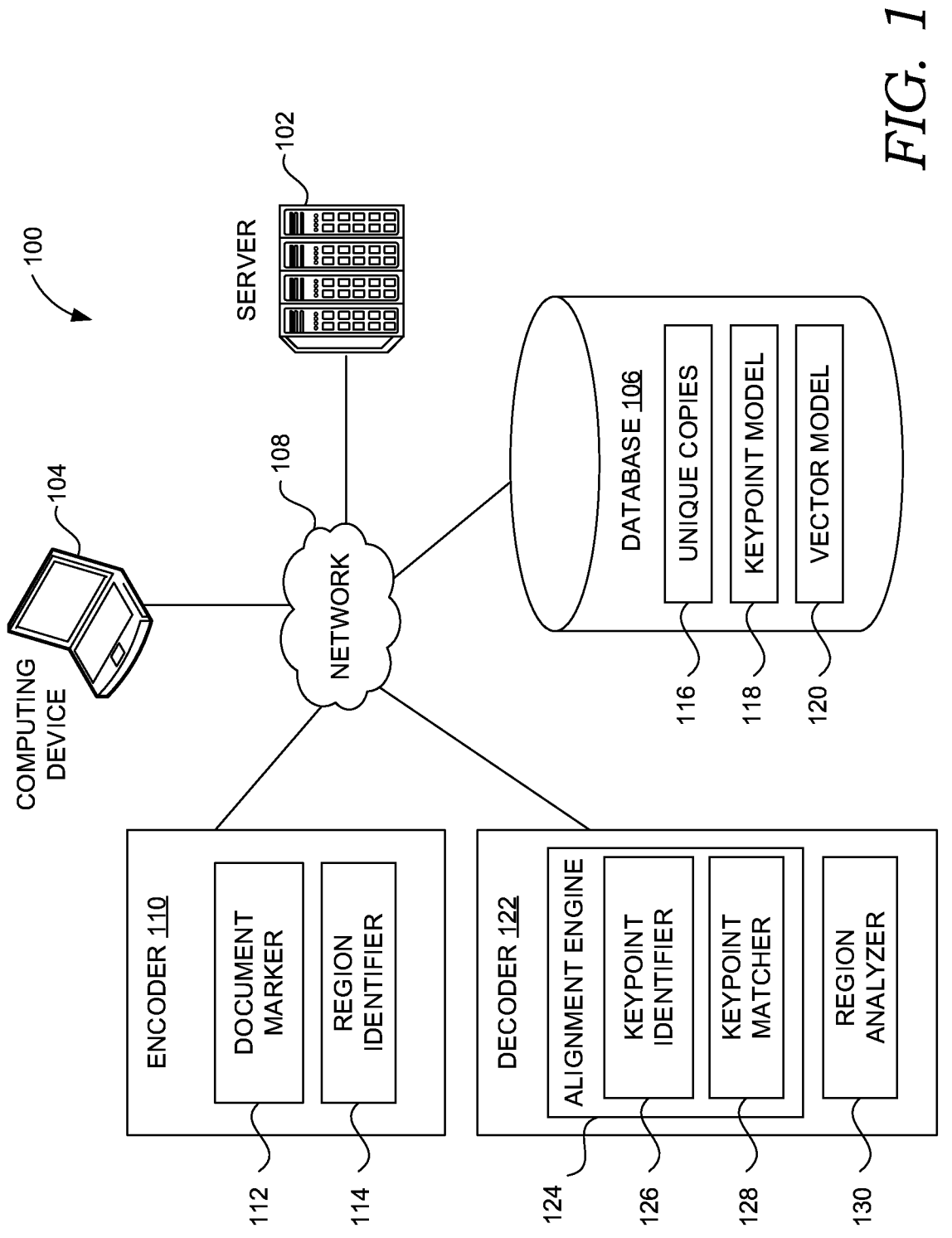
FIG. 1 illustrates an example operating environment in which aspects of the technology can be employed, in accordance with an aspect described herein.

Existing systems for managing private documents lack robust detection methods for identifying sources of document leaks. In particular, many of these systems fail when a recovered artifact is only a fragment of an original copy. Similar failures have been observed when the artifact recovered is a different type form the original, such as a different file format, a photo, or printed copy.

As an example, methods that use unique spacing patterns and seek to detect those unique spacing patterns may fail when there is a change in perspective or any other visual distortion between the artifact and the original. That is because the imaging technology from which the artifact is produced, e.g., a computer monitor, a scanner, or a camera phone, can distort the spacing differences at various positions of the original document. Thus, from a computer imaging or detection standpoint, this changes the spacing differences across the document, and without correction, could cause the system to not identify the original document as the source of the artifact.

Other prior methods use spacing patterns after specific characters, such as a period. For instance, one or two spaces might be added after a period to encode a binary signature that can then be detected and used to identify a document. However, this method is susceptible to changes in document formatting. As an example, changing the formatting of a document from left alignment to a justified formatting distorts the spacing and might obscure the encoded information. Further still, this method could also be susceptible to fragmentation. This occurs when the artifact does not depict the entire document. If the fragment only includes a portion of the text having the spacing signature, the encoded information might not be enough to make an accurate match, since the single modality spacing method spreads the signature across the document to such a degree that large parts of the document might be needed to properly identify the document from the artifact. Not only can the formatting obscure the encoded information, it can also render a document that has reduced readability or perceived professionalism.

Another problem commonly found in conventional techniques relates to resizing, which can result in a reduction of image quality and a smaller crop of the document. Frequently, when document is copied, in whole or in part, the derived version is a different size or quality. For instance, the quality may drop in DPI (dots per inch), or the derived version may be a different size, such as being reduced to 75% of the original size. Conventional methods, such as those identifying certain spacing distance or character features are susceptible to high levels of inaccuracy when the quality or size of a document is changed when it's copied.

Aspects of the technology described herein solve many of these problems. As will be described, some aspects reduce the fragment size needed to identify a document from an artifact using computer vision techniques when compared to prior known methods, such as those previously described. Further, some aspects herein correct for distortion that can occur when an artifact is derived, such as those distortions created from perspective changes.

One method that achieves these benefits over prior techniques in this area starts by generating a set of unique copies of an original document. The unique copies are generated by applying one or more perturbations to the copies that make subtle, yet detectable, changes between the original and the copies. Each copy includes a different perturbation relative to the other copies, making each copy unique among the set. The unique copies can then be individually distributed and a record kept indicating the recipient of each unique copy.

An artifact derived from one of the unique copies can be used to identify the unique copy from which it was derived. To do so, artifact keypoints are identified within the artifact. Likewise, unique copy keypoints are identified within each of the unique copies. Keypoints may be identified for any distinguishing feature within a document or artifact, such as a corner created by content within the artifact or unique copies.

Unique copy keypoints are matched to artifact keypoints to align the artifact with the unique copies. Based comparing the keypoints, e.g., comparing a similarity of pixel patterns that may constitute the keypoints, the unique copy keypoints are then matched with artifact keypoints to identify a candidate set of matches. To reject outliers that are false positives, an optimization problem may be solved to retain the subset of matching pairs that conform to a rigid geometric alignment. This optimization algorithm effectively helps remove many of the distortions, such as perspective changes, that cause the above described conventional methods to fail. The alignment further helps adjust for resizing issues, allowing for better comparisons of accurate regions between the unique copy and the artifact relative to the conventional methods. The matching also better aids in alignment, even when the artifact has been reduced in quality as compared to conventional methods. A number of post hoc geometric checks can be leveraged to ensure that the alignment is sensible and matches the scale and shape properties of the original document.

The matching may be done by identifying pixel neighborhoods surrounding each of the keypoints. Features, such as pixel intensity gradient, can be represented by vectors. The pixel neighborhoods for the keypoints are compared in the vector space, and their associated unique copy keypoints and artifact keypoints can be matched based on the vector distances. The matching helps identify the location of the unique copy from which the artifact was derived. In doing so, relatively smaller fragments can be used to identify a unique copy as compared to previously described conventional methods.

Based on the alignment process using the keypoint matching, pixel regions within the unique copies can be compared to pixel regions within the artifact to determine whether the artifact was derived from the unique copy. That is, pixel regions within the unique copies can be identified. For instance, these may be identified based on whether an area of the unique copy includes a perturbation from the original document. Bounding boxes are one example method of identifying pixel regions and are recognizable by many computer vision algorithms. Due to the alignment process, the artifact includes areas that correspond to the pixel regions of the unique copies. For instance, a first pixel region in a unique copy has a corresponding second pixel region in the artifact.

The pixels within each of these regions can be compared, e.g., by using vector methods previously discussed. Based on the comparison, the unique copies can be ranked by the likelihood that the artifact was derived from the unique copy. That is, the pixels in the first pixel region of the unique copy will be relatively closer to the pixels of the second pixel region in the artifact in the vector space, relative to the other unique copies, based on how closely the pixel regions match. As such, the unique copies can be ranked based on sub-image similarity metrics, thus indicating an ordered likelihood of whether the artifact was derived from the ranking of unique copies. The top ranked unique copy can be identified, e.g., selected, as the unique copy from which the artifact was derived. Then, an indication of the identified unique copy can be output. The unique copy can then be used to identify the initial recipient of the unique copy.

Not only does the above described technology serve to provide an advancement over prior detection systems, the technology also imparts improvements to the computing device on which the technology is executed. As noted, the method provides for aligning the artifact with each of the unique copies based on the keypoints. A threshold vector distance value can be used to identify unique copies with relatively poor alignment, meaning these unique copies have a low likelihood of being the unique copy from which the artifact was derived. As such, unique copies not satisfying the threshold vector distance can be removed, and a subset of unique copies selected from the remaining unique copies. The pixel comparison within the pixel region can then be done on the subset. Since this comparison can be computationally expensive, fewer computing resources are required to process the subset relative to the entire set. As such, computational resources can be preserved for other tasks, and the technology can be employed on relatively smaller computing devices with less processing power when compared to some of the conventional methods.

It will be realized that the method previously described is only an example that can be practiced from the description that follows, and it is provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 comprises server 102, computing device 104, and database 106, which are communicating via network 108.

Database 106 generally stores information including data, computer instructions (e.g., software program instructions, routines, or services), or models used in embodiments of the described technologies. Although depicted as a single database component, database 106 may be embodied as one or more databases or may be in the cloud.

Network 108 may include one or more networks (e.g., public network or virtual private network (VPN)) as shown with network 108. Network 108 may include, without limitation, one or more local area networks (LANs), wide area networks (WANs), or any other communication network or method.

Generally, server 102 is a computing device that implements functional aspects of operating environment 100, such as one or more functions of encoder 110 and decoder 122. One suitable example of a computing device that can be employed as server 102 is described as computing device 1000 with respect to FIG. 16. In implementations, server 102 represents a back-end or server-side device. While illustrated as a single component, server 102 is intended to illustrate one or more devices.

Computing device 104 is generally a device that may be used to facilitate document marking and identification in combination with server 102. As with other components of FIG. 1, computing device 104 is intended to represent one or more computing devices. One suitable example of a computing device that can be employed as computing device 104 is described as computing device 1000 with respect to FIG. 16. In implementations, computing device 104 is a client-side or front-end device. In addition to server 102, computing device 104 may implement functional aspects of operating environment 100, such as one or more functions of encoder 110 and decoder 122.

Thus, it will be understood that some implementations of the technology may comprise either a client-side or front-end computing device, such as computing device 104, a back-end or server-side computing device, such as server 102, or both, executing any combination of functions from encoder 110 and decoder 122, among other functions.

As noted, the technology is suitable for generating unique copies of an original document and identifying a unique copy from which an artifact was derived. Encoder 110 and decoder 122 may be employed to perform this functionality. In general, encoder 110 encodes unique information within copies of an original document by making one or more perturbations between the original document and each unique copy. Decoder 122 generally identifies a unique copy from which an artifact of the unique copy is derived.

Figure 2:
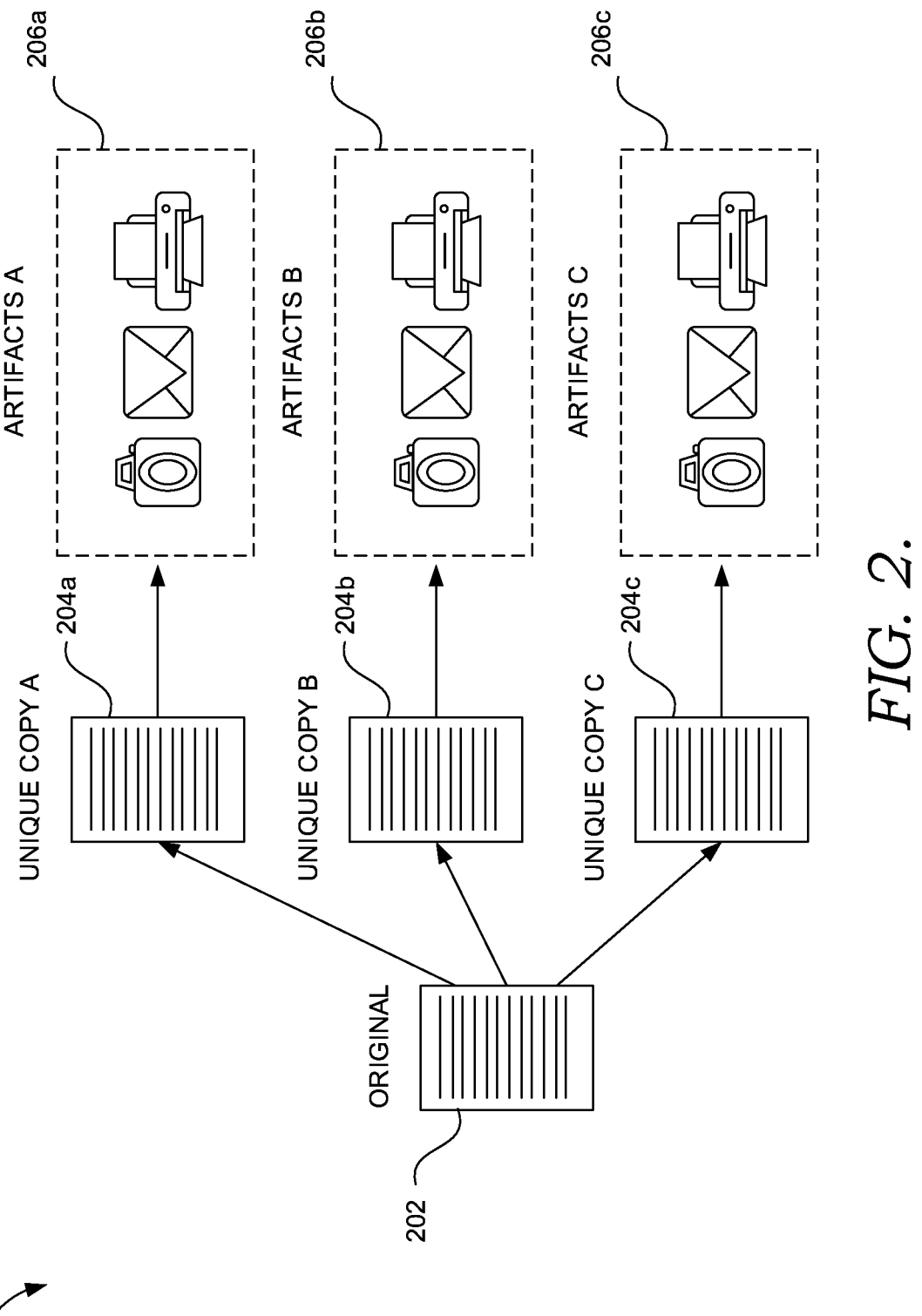
FIG. 2 illustrates an example set of unique copies generated from an original document and artifacts derived therefrom, in accordance with an aspect described herein.

FIG. 2 illustrates an example set of unique copies that has been generated using encoder 110 and artifacts derived from these unique copies. FIG. 2 illustrates original document 202. Generally, an original document, such as original document 202, may be any document type that conveys content therein, such as text, images, tables, graphs, and so forth. For example, documents, including original documents, unique copies, artifacts, and so forth, can include various file types, such as JPEG (joint photographic experts group), GIF (Graphics interchange format), SVG (scalable vector graphics), PNG (portable network graphic), BMP (bitmap), TIFF (tagged image file format), PDF (portable document format), Word document (e.g., DOC, DOCX), HTML (hypertext markup language), spreadsheets (e.g., XLS or XLSX), text files (e.g., TXT, WPD), PowerPoint (e.g., PPT, PPTX), ODP (open document presentation), KEY (Keynote file), message file (MSG), and email (EML), among other document types.

Unique copies, such as unique copies 204a-204c, are copies of an original document, such as original document 202, in which encoder 110 has made a perturbation. Unique copies are unique in that one unique copy has a different perturbation between the original and the unique copy relative to another unique copy. In this way, there is a distinctive feature for each of the unique copies. Encoder 110 may mark each of the unique copies with one or more perturbations, giving them a distinctive watermarking that can be used to individually distinguish each unique copy. These perturbations may be applied in a manner that is challenging to detect with the human eye, but can be identified by a computing device to identify the unique copy from the others.

As an example, one or more perturbations, i.e., changes, made by encoder 110 to an original document to generate a unique copy may include changes in spacing, such as adding or removing spaces. Spaces between content, such as text characters, may be changed by increasing or decreasing the number of pixels of the space between the content. In implementations, this may be done in a net-zero manner. That is, pixel spaces within vertical or horizontal lines of content can be added and removed so that there is no net change over the entire line of the document, making the unique copy resemble the original document. For example, a pixel of space may be added between content along a line of the document, while another pixel of space is removed from the same line, making the unique copy appear similar to the original document when viewed with the human eye. Another example perturbation includes font changes. For instance, fonts similar to the font used can be changed for one or more characters. Other perturbations may include general changes to the content, such as adding, removing, lengthening, or shortening parts of characters, such as an ear on the text of some fonts. Any number of perturbations to a unique copy can be made, and any one or more types of changes can be made when generating a unique copy. Various changes may be made throughout a document when generating a unique copy so that individual fragments of the unique copy can be used to positively identify the unique copy.

Unique copy, such as unique copies 204a-204c, can be distributed to individual recipients. Thus, each recipient receives a unique copy of the original document that is unique to the recipient. Unique copies may be provided in any manner, such as a printed document, an email attachment, a message body, or other like delivery method. A mapping (e.g., a data index) can be kept to indicate an association between a unique copy and a recipient, thus allowing identification of a recipient via the mapping when the unique copy is known, e.g., has been identified from an artifact.

Some example artifacts are also illustrated in FIG. 2 as artifacts 206a-206c. In general, artifacts are derivations of a unique copy. As illustrated in FIG. 2, artifacts A 206a has been derived from unique copy A 204a, artifacts B 206b has been derived from unique copy B 204b, and 206c has been derived from unique copy C 204c.

In general, an artifact, such as those illustrated, can be any derivation, in whole or in part, from a unique copy. For instance, an artifact may be a whole document of the same file type. For example, this may occur if a unique copy is attached to an email or included in the body of an email that is then forwarded to another recipient. An artifact may be a fragment of a unique copy that is the same file type. As an example, if a portion of a pdf document is provided to someone other than the initial recipient as a pdf, the portion provided is an artifact of the unique copy. In another example, the artifact may be a whole or partial replication of a unique copy that is in a different format. For instance, a photo, snip, or cut and paste of the unique copy can derive an artifact. Artifacts may be in the form of the computer-readable file formats, photos (including various angles), printed documents, copied and pasted content, email attachments, and other like derivations. Artifacts may include compound artifacts, such as those artifacts having multiple or combinations of derivations from the unique copy. For instance, a photo of a printed version of a unique document, or a document that has been converted through various file formats.

Figure 3:
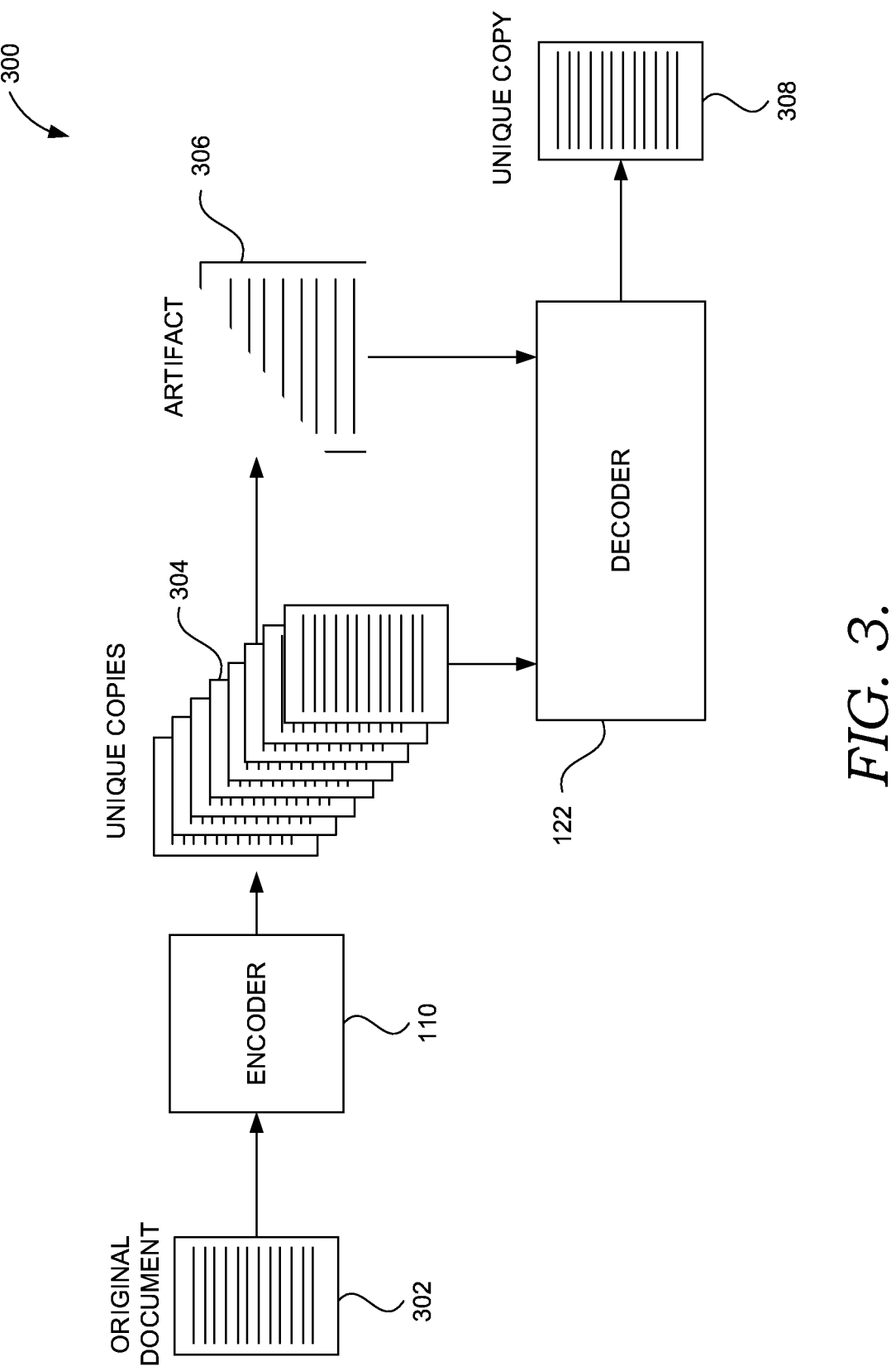
FIG. 3 illustrates an example process of generating unique copies and identifying a unique copy from which an artifact is derived, in accordance with an aspect described herein.

Encoder 110 and decoder 122 of FIG. 1 can be employed as illustrated in process 300 of FIG. 3. Referring to both FIGS. 1 and 3, encoder 110 receives original document 302 and outputs unique copies 304. Each unique copy of unique copies 304 is provided to a recipient so that each recipient has one of unique copies 304, thus providing the recipient with a copy of original document 302 that is unique to that recipient. To generate unique copies 304, encoder 110 may employ document marker 112 and region identifier 114, as illustrated in FIG. 1.

In general, document marker 112 marks an original document, such as original document 302, with a perturbation, i.e., some change to the content of the original document to generate a unique copy. As noted, the perturbations can be made throughout the original document when generating a unique copy. A different set of perturbations may be made to each unique copy so that the unique copies are individually distinguishable. As previously discussed, markings made to the original document to form the perturbations may include various types of changes that are difficult to detect with the human eye, but can be identified using a computing device. To do so, pixels may be changed between the original document and the unique copy so as to alter the spacing, which can be in a net zero manner; remove or add portions of the content, such as changing a font or feature of the content within the document; adjust table demarcations; and so forth. Document marker 112 may apply one modality of change to a document to form a unique copy or apply various combinations of changes to form the unique document. For instance, a unique copy may include only changes to spacing, or may include changes to spacing along with other changes, such as alterations to various characters. The unique copies, data associated with the changes, or an associated recipient of a unique copy can be stored in database 106, for example, as unique copies 116.

Region identifier 114 can be employed by encoder 110 to identify one or more pixel regions within unique copies. Pixel regions are generally locations within a document that are suitable for representation by pixels. For instance, a document having content is generally suitable for display at a display device, where the display device could represent or display the content using pixels. As such, the document has pixel regions that are parts of the document that could be projected using a display device having pixels to illuminate and distinguish the document's content.

Region identifier 114 identifies one or more pixel regions within unique copies. In many documents and document types, pixel regions can be identified using x-y coordinates. The identified pixel regions may be the same between unique copies or may be specific to each unique copy. In an embodiment, region identifier 114 identifies a pixel region based on perturbations within the unique copy made by document marker 112. That is, region identifier 114 may identify a portion of a unique copy as a pixel region based on that portion having a perturbation made by document marker 112. In some cases, areas that do not contain perturbations may not be identified as a pixel region. It will be understood that areas not identified as pixel regions may also include content that can be represented by pixels at a display device. Instead, pixel regions can be identified as an area of a unique copy that has content suitable for display at a display device in which the content includes a perturbation between the original document and the unique copy. As will be further discussed, the identification of pixel regions may assist a computer in identifying a unique copy from an artifact by comparing pixels in areas that are known to have perturbations.

In aspects, pixel regions are identified by bounding boxes. For instance, a portion of a unique copy that is identified as an area having a perturbation can be identified using a bounding box to separate the pixel region from the remainder of the document. Region identifier 114 can be used to apply bounding boxes to areas identified as pixel regions. As an example, various text recognition algorithms may be applied to a document to determine the location of text and apply a bounding box around the identified text. One example that can be used is employed by Apryse, which includes a text extraction algorithm. Images in documents can be identified by bounding boxes as well. Many images in a document have predefined borders. These can be used to apply a bounding box to identify the image. In other cases, an image recognition algorithm can be employed to identify images as content within a document, and a bounding box can be applied to the area surrounding the image so that the bounding box includes the image. Apryse also includes image extraction algorithms that may be suitable for use for some document types. An example algorithm is included in itext, pdf2Data, an iText 7 add-on, available at https://itextpdf.com/sites/default/files/2018-10/Whitepaper_pdf2Data_2017.pdf.

In an aspect, region identifier 114 identifies pixel regions in a document based on the content in the document. That is, region identifier 114 identifies content, such as text or images, and identifies the area comprising the content as a pixel region. Once identified, region identifier 114 may apply a bounding box around the pixel regions. In an implementation, region identifier 114 applies bounding boxes around a subset of the identified pixel regions, where each pixel region of the subset includes a perturbation. Thus, pixel regions can be identified based on whether the area includes a perturbation, and then a bounding box applied to that area. In an aspect, those pixel regions having been identified as including content that does not include perturbation may not be identified using bounding boxes, or that is, be excluded from the bounding boxes that comprise areas having perturbations.

Figure 5:
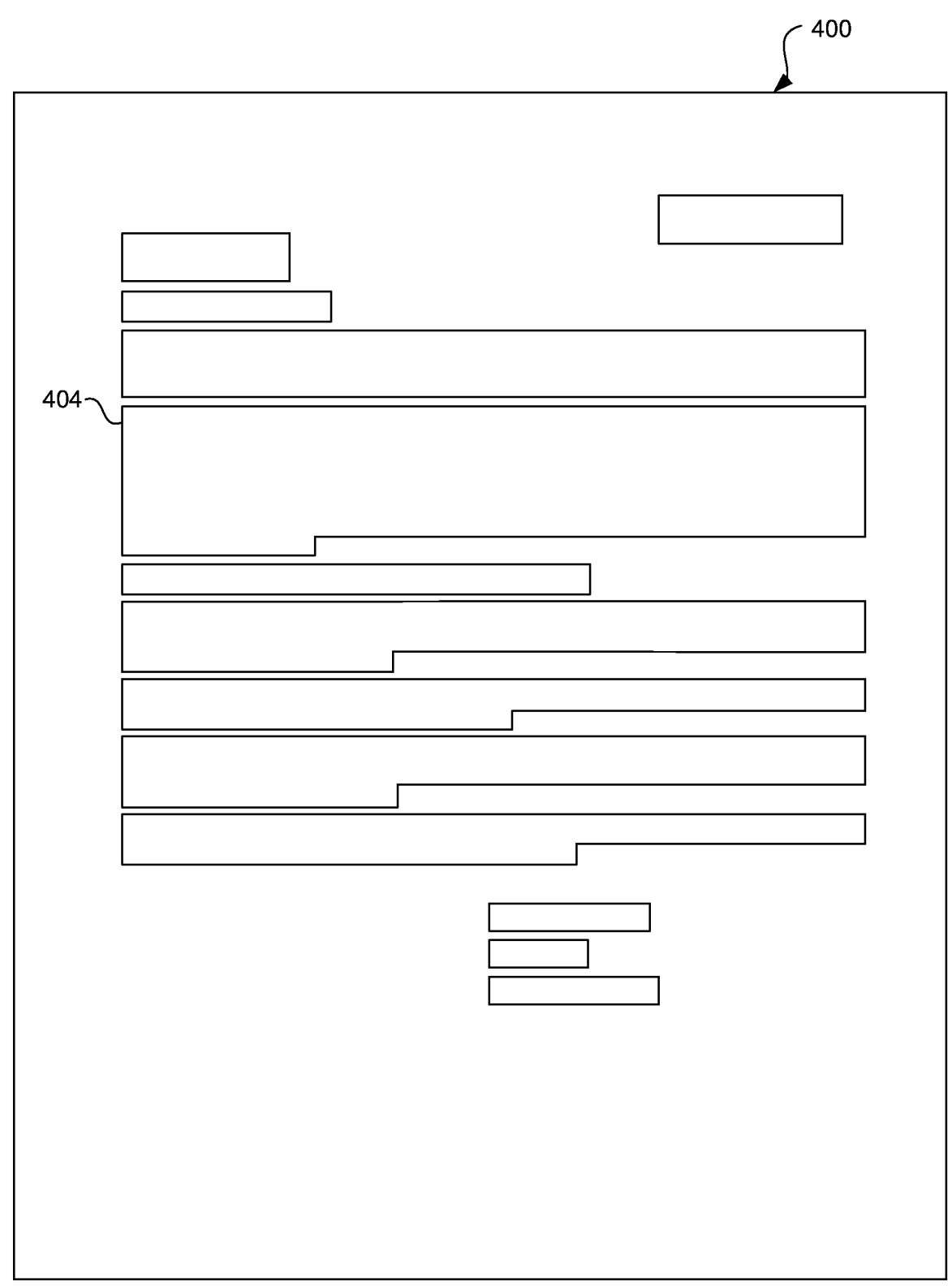
FIG. 5 illustrates the unique copy of FIG. 4 having an example set of bounding boxes identifying pixel regions therein, in accordance with an aspect described herein.

An example is illustrated using FIGS. 4 and 5. FIG. 4 illustrates an example unique copy 400 of an original document. Unique copy 400 include perturbations throughout the content, which is text-based in this example. A text recognition algorithm is applied by region identifier 114 to identify pixel regions within unique copy 400. Bounding boxes are then placed onto areas that include the identified text.

FIG. 5 illustrates a set of bounding boxes that have been placed to identify pixel regions comprising the text within unique copy 400. Bounding box 404 is one example. In the figure, the text has been removed to more clearly show the bounding boxes identifying the pixel regions in unique copy 400 at which text is located. As noted, in an implementation, one or more of the bounding boxes may be removed as identifying a pixel region based on the removed bounding box comprising content that does not include a perturbation from the original document.

Having applied perturbations to a document to generate unique copies using document marker 112 and identified pixel regions using region identifier 114, the resulting unique copies can be stored, such as unique copies 116 in database 106. In an aspect, the locations of the pixel regions, for instance, bounding boxes represented by x-y coordinates, can be stored in association with each unique copy of unique copies 116, such as storing the information as document metadata or using an index to provide a computer recallable association.

Turning back now to FIG. 3, artifact 306 has been derived from a unique copy of unique copies 304. Although artifact 306 is illustrated as a fragment, as previously discussed, artifact 306 may be a derivation in whole or in part of unique copies 304, and may be in the same file format or a different file format. Decoder 122 is used to identify which unique copy of unique copies 304 from which artifact 306 was derived, illustrated here as unique copy 308.

Referring also to FIG. 1, decoder 122 may identify unique copy 308 by employing alignment engine 124 and region analyzer 130. In general, alignment engine 124 aligns an artifact, such as artifact 306, with unique copies, such as one or more of unique copies 304. Region analyzer 130 generally analyzes pixel regions within the unique copies and the artifact once aligned. Based on the alignment, region analyzer 130 compares the pixel regions between unique copies and the artifact to identify the unique copy from which the artifact was derived.

Alignment engine 124 further comprises keypoint identifier 126 and keypoint matcher 128, which can be employed to align a unique copy to an artifact. Alignment engine 124 may perform an alignment between an artifact and one or more unique copies of a set of unique copies generated from an original document. Keypoint identifier 126 generally identifies keypoints in the unique copies, referred to as unique copy keypoints, and keypoints in the artifact, referred to as artifact keypoints. Keypoints can be identified for any distinguishing feature within a document or artifact. In some cases, keypoints may refer to an area of one or more pixels, e.g., a distinctive pixel patterns, located at the distinguishing feature, including a pixel neighborhood, as will be further described. Features for which keypoints may be identified include content features that may be reproduced from the unique copy to the artifact. One such example uses corners created by content within the unique copy and the artifact. For example, corners may be created by text aligned at a margin, the location of a return in the text, spacing between text lines or characters, along a line across which text is generated, at edges of images, at the edges of image borders, among other locations created by the content of the document.

To identify corners, keypoint model 118 can be trained and stored. Keypoint model 118 generally receives as an input a unique copy or an artifact, and respectively identifies unique copy keypoints or artifact keypoints. One example of keypoint model 118 comprises a neural network trained on a labeled dataset. One specific example is a convolutional neural network. The labeled dataset may include documents having labeled corners, such as any of those described.

Keypoint model 118 identifies corners based on its training and responsive to the input. One model that may be suitable for use is the Shi-Tomasi Corner Detector. This can be found at OpenCV, available at https://docs.opencv.org/3.4/d4/d8c/tutorial_py_shi_tomasi.html, the contents of which are incorporated by reference herein in their entirety. Having identified corners using keypoint model 118, the corners can be associated with keypoints, such as unique copy keypoints or artifact keypoints. In implementations, keypoint model 118 may identify upwards of 100,000 keypoints in a document. In some cases, the number of keypoints may be as low as 1,000 or less. In general, the larger the document and the more content included within the document, keypoint model 118 will identify a greater number of keypoints.

Figure 6:
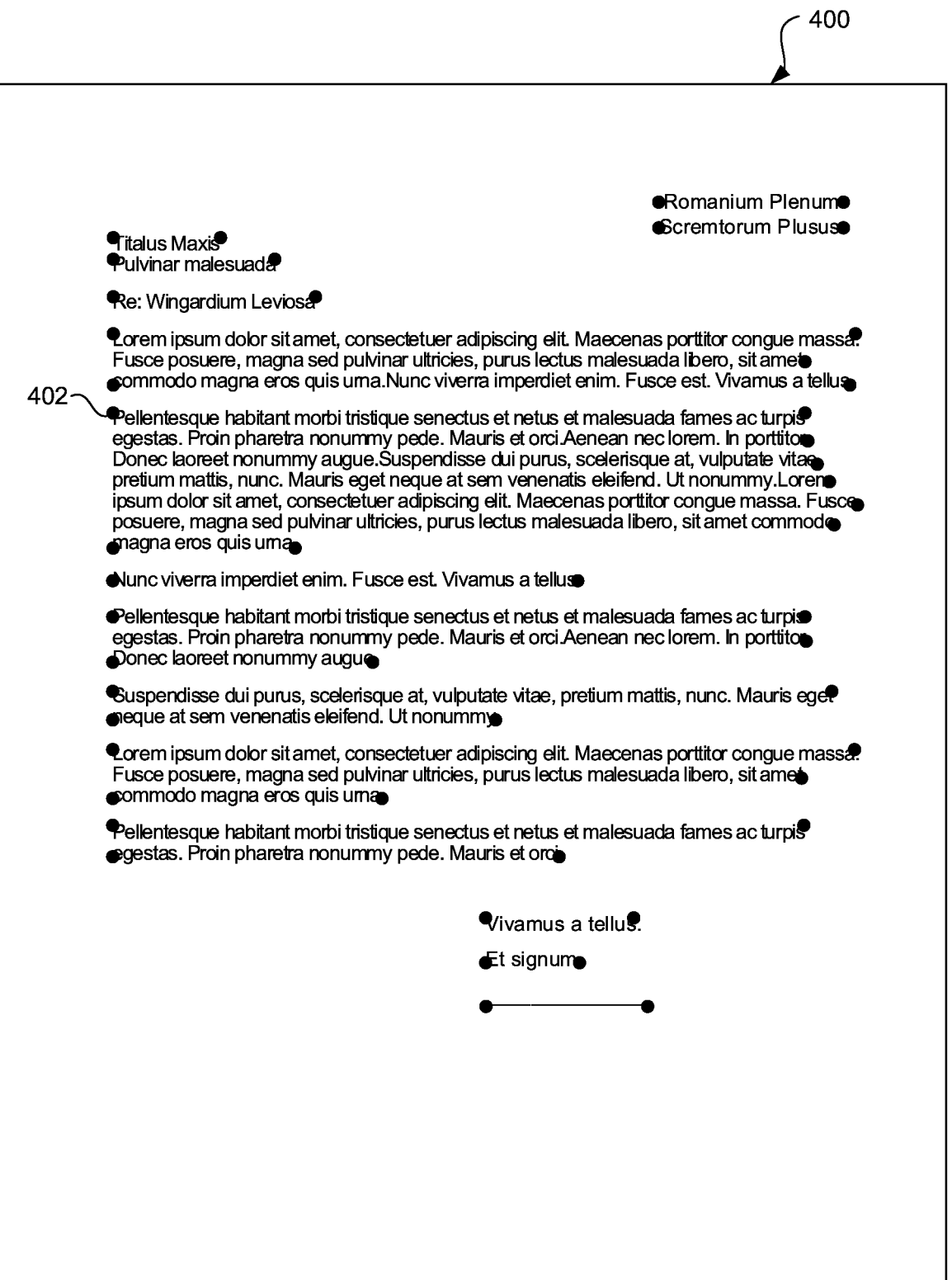
FIG. 6 illustrates the unique copy of FIG. 4 having example unique copy keypoints, in accordance with an aspect described herein.

FIGS. 4 and 6 illustrate an example of using keypoint identifier 126 to identify unique copy keypoints. Here, unique copy 400 of FIG. 4 is provided as an input to keypoint model 118. FIG. 6 illustrates some examples of keypoints identified by keypoint model 118 responsive to the input. It will be understood that this is only an example and that more or fewer keypoints across various locations of unique copy 400 may be identified. As illustrated in FIG. 6, unique copy keypoint 402 is an example of one keypoint that is identified within unique copy 400.

Figure 8:
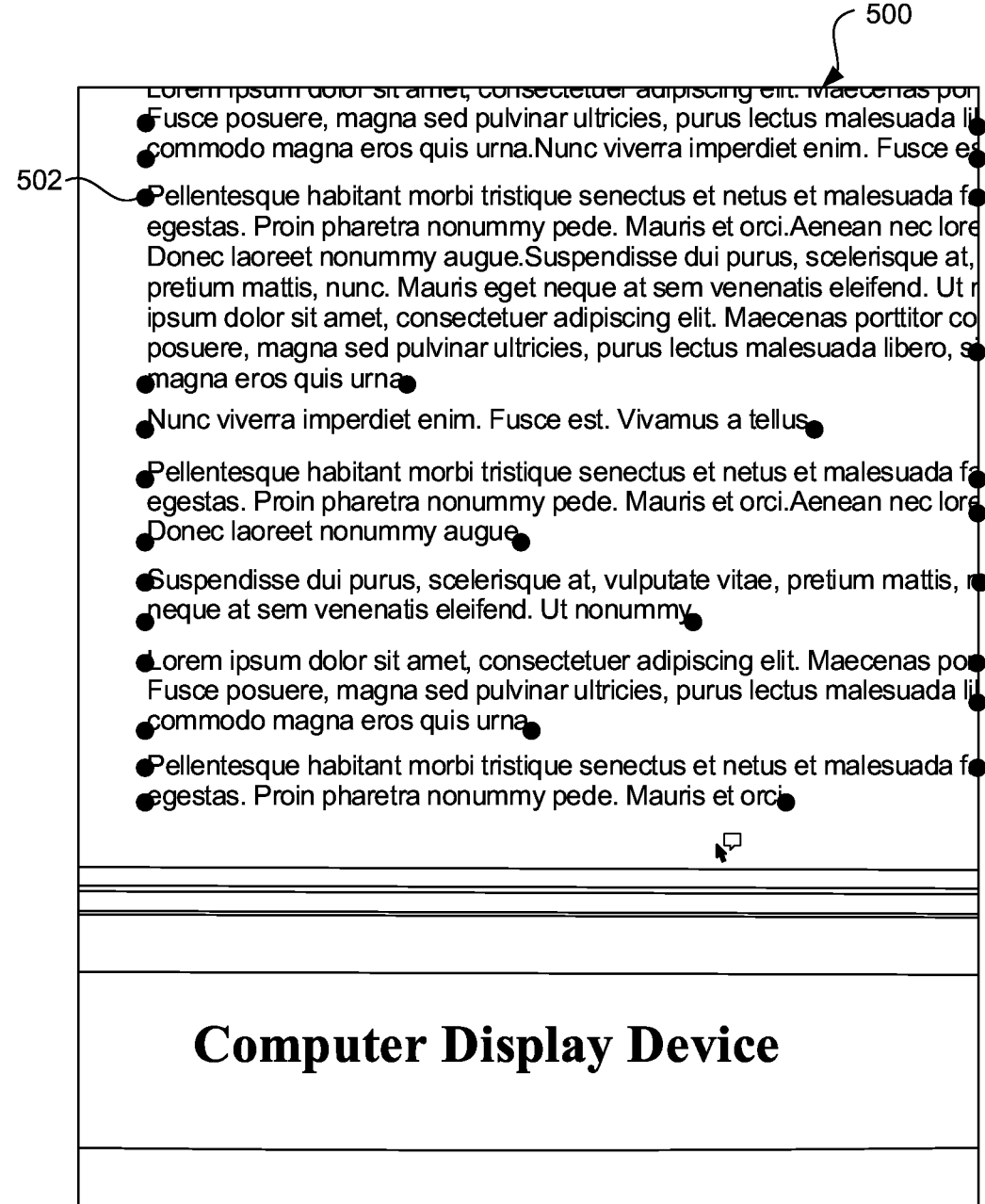
FIG. 8 illustrates the example artifact of FIG. 7 having example artifact keypoints, in accordance with an aspect described herein.

FIGS. 7 and 8 similarly illustrate an example of using keypoint identifier 126 to identify artifact keypoints. Here, artifact 500 of FIG. 7 has been derived from unique copy 400. In this example, artifact 500 is a photo of unique copy 400 that was taken when unique copy 400 was displayed at a display device. Further, artifact 500 is a fragment of the unique copy 400, as it only includes a portion of the document. Artifact 500 of FIG. 7 can be provided as an input to keypoint model 118, which identifies artifact keypoints, as illustrated in FIG. 8, responsive to the input. It will be understood that this is only an example and that more or fewer keypoints across various locations of artifact 500 may be identified. Artifact keypoint 502 is provided to illustrate one example artifact keypoints of those illustrated in FIG. 8.

To align a unique copy with an artifact, alignment engine 124 employs keypoint matcher 128 to match unique copy keypoints to artifact keypoints. In general, alignment engine 124 matches one or more of the unique copy keypoints to one or more corresponding artifact keypoints located in the artifact to determine the location in the unique copy from which the artifact was derived. As will be described, by aligning the artifact to the location from which it was derived from the unique copy, pixel regions from the unique copy can be compared to corresponding locations within the artifact to determine whether the artifact was derived from the unique copy. Alignment further helps adjust for the distortions that can be caused by perspective changes between the artifact and unique copy, allowing for a higher degree of comparison between the two when applying computer vision techniques relative to conventional methods that don't adjust for these offsets. It will be understood that, in some implementations of the technology, "alignment" is performed as a function of computer vision and comprises a determination or identification of which areas or pixels of the unique copy correspond to those of the artifact.

One example method that can be employed by keypoint matcher 128 to match keypoints uses pixel neighborhoods. Using this method, pixel neighborhoods are identified for the unique copy keypoints and the artifact keypoints. Pixel neighborhoods include an area that at least partially, or fully, surrounds a keypoints. For instance, pixels within a defined radius of a keypoint are within the pixel neighborhood of the keypoint. As an example, the radius defined for the pixel neighborhoods may be 5 pixels, 10 pixels, 15 pixels, 20 pixels, and so forth. It will be understood that the pixel neighborhood may be adjusted to any defined distance to tune the comparison between the pixel regions, which will be described in further detail.

Keypoint matcher 128 can employ vector model 120 to represent the pixels within the pixel neighborhoods as vectors in the vector space. That is, a feature of a pixel can be represented as a vector. While many pixel features may be used, such as color, one such feature that has been identified as suitable is the pixel intensity gradient, e.g., a representation of the intensity of one pixel relative to adjacent pixels. One such algorithm that is suitable as vector model 120 uses SIFT (Scale-invariant feature transform). An example of this algorithm is provided by OpenCV and available at https://docs.opencv.org/4.x/da/df5/tutorial_py_sift_intro.html, the contents of which are hereby incorporated by reference in their entirety. In general, vector model 120 can be used to look at pixel neighborhoods at various levels of blurring and compare features at the various levels. This vectorizes the pixel space around the keypoints.

By representing features of the pixel neighborhoods as vectors, the vectors representing pixels in pixel neighborhoods of unique copy keypoints can be compared to the vectors representing the pixels in pixel neighborhoods of the artifact. A Euclidean distance can be used to compare the vectors of the unique copy keypoint pixel neighborhoods to the artifact keypoint pixel neighborhoods. That is, the relatively closer the vectors of the unique copy keypoint pixel neighborhoods are to the vectors of the artifact keypoint pixel neighborhoods, the more likely the respective keypoints are to match. As such, keypoint matching can be done based on the vector distances between the vectors of the pixel neighborhoods of unique copy keypoints and the pixel neighborhoods of the artifact.

In an aspect, a rigid transformation can be applied to restrict the matching of the unique copy keypoints to the artifact keypoints in a manner that limits the orientation of the artifact relative to the unique copy. The rigid transformation restricts the matching of the keypoints along certain rotations, translations, reflections, or any sequence of these, of the artifact. This can help limit the number of false alignments between the artifact and the unique copies. In essence, the rigid transformation restricts the size and shape of the geometry of the artifact relative to the unique copy when matching the keypoints. A least squares analysis can be used as part of the rigid transformation to properly orient the artifact relative to the unique copy. For instance, the rigid transformation can restrict the artifact to the same two-dimensional plane of the unique copy, aligning both on the same x-y coordinate plane, effectively aligning the artifact so that it has substantially the same perspective as the unique copy to which it will be compared. Since the matches may contain outliers or false positives, a robust linear systems of equations is solved to find matches that are consistent with a rigid geometric alignment. To separate false positives and outliers, local optimization (LO) step is applied to gather a set of high-confidence inliers which align with the unique copy in a consistent way. At each step of the optimization, the determinant of the least squares solution is constrained to ensure a rectangular final alignment. This can be used to restrict the artifact from having a certain determinant to align it with the x-y plane of the unique copy. To do this in the document space, the projective transformation restricts the matrices for rotation, translation, and scale. The alignment of the artifact to the unique copy can be scored using an $R^2$ measure, for example.

Figure 9:
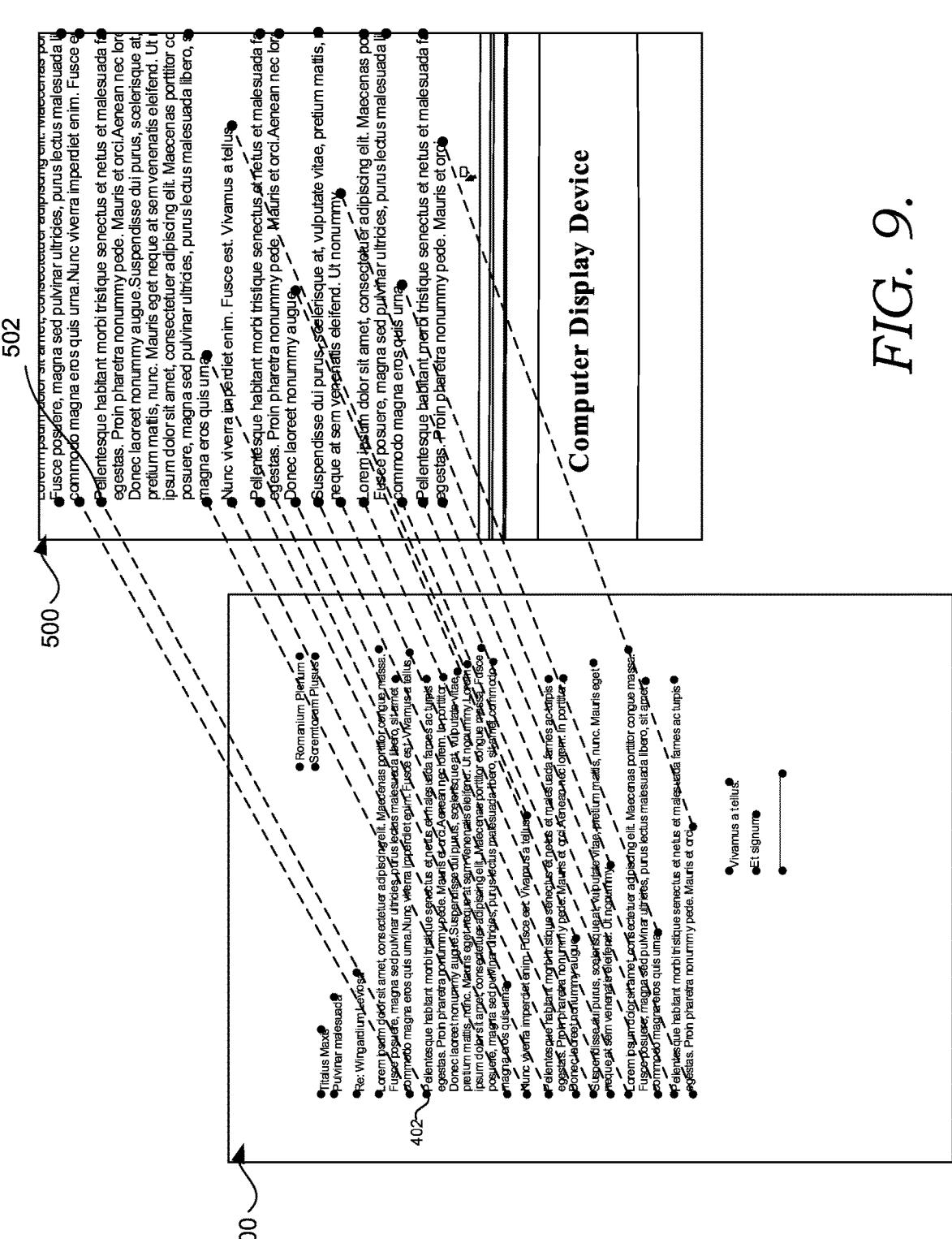
FIG. 9 is an illustrative matching of the unique copy keypoints of FIG. 6 with the artifact keypoint of FIG. 8, in accordance with an aspect described herein.
Figure 10:
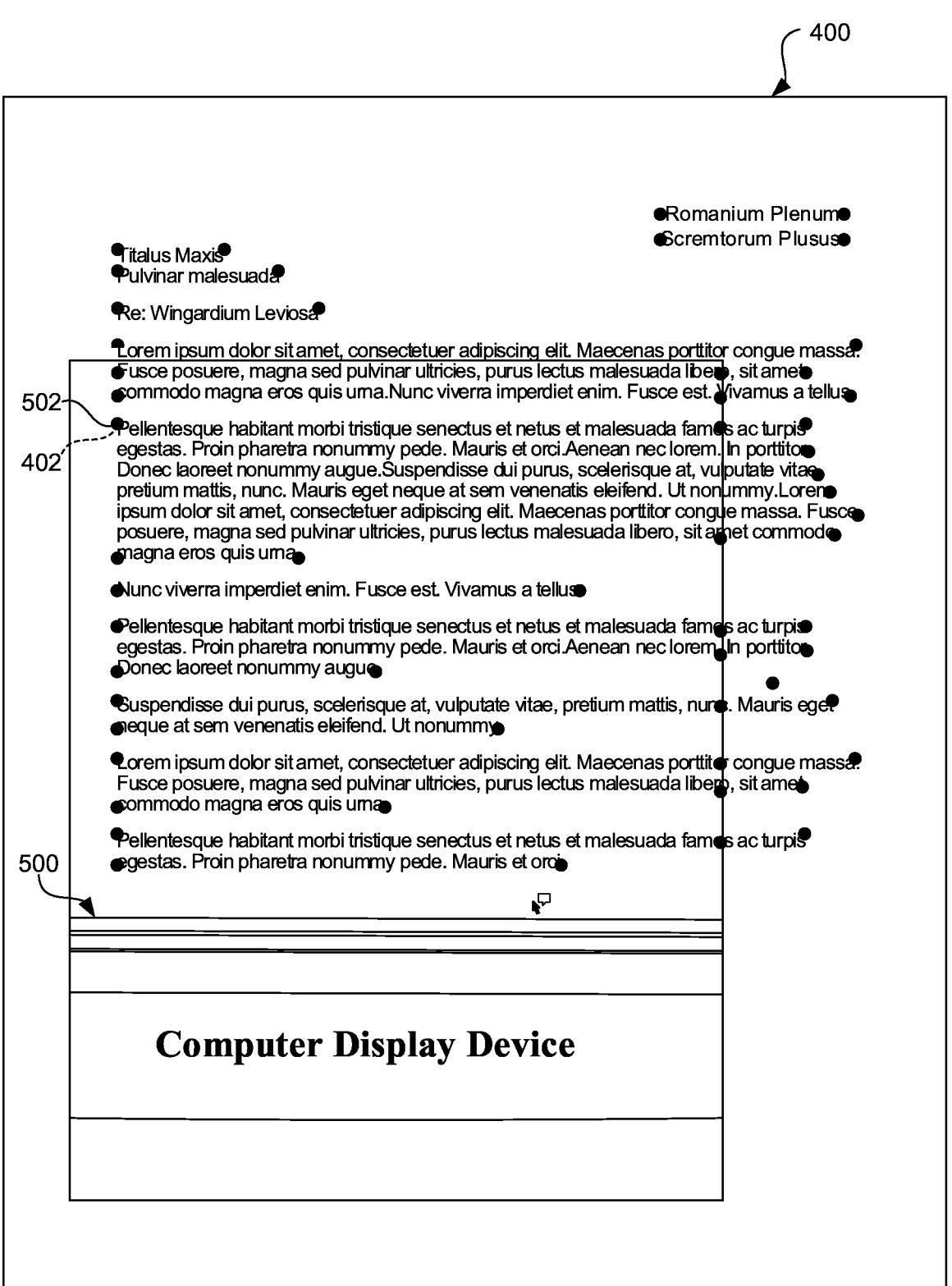
FIG. 10 illustrates an overlay of the unique copy of FIG. 6 with the artifact of FIG. 8 based on the matching shown in FIG. 9, in accordance with an aspect described herein.

FIG. 9 is an example illustration of keypoint matcher 128 matching unique copy keypoints of unique copy 400 to artifact keypoints of artifact 500. One particular example shows unique copy keypoint 402 matching with artifact keypoint 502. Based on the matching, artifact 500 is effectively aligned with unique copy 400 along the same plane. At the same time, this aids in identifying the location from which artifact 500 was derived from unique copy 400. This is illustrated in FIG. 10, illustrating an overlay of artifact 500 of FIG. 6 with the artifact of FIG. 8 based on the matching shown in FIG. 9. In this example overlay, artifact keypoints, such as artifact keypoint 502, have been aligned with unique copy keypoints, such as unique copy keypoint 402.

As noted, the matching helps identify the location of a unique copy from which an artifact was derived. In doing so, relatively smaller fragments can be used to identify a unique copy as compared to previously described conventional methods. This is because of the high degree of accuracy the alignment provides, thus allowing regions within the unique copy to be compared with corresponding regions within the artifact. The alignment allows the regions to be compared to a higher degree of accuracy relative to the conventional methods described that don't include such an alignment process when comparing documents. Further, the alignment helps adjust for sizing that may occur when an artifact is derived. This is an improvement over conventional methods that don't adjust for sizing issues, leading to false positive or false negative document matches due to the size distortions. Further, the high degree of accuracy provided by aligning unique copies to an artifact allows for comparisons to be made with lower quality artifacts when compared to conventional methods. Since the comparison is comparing a location within the unique copy to an artifact, there is a higher degree of confidence that the locations being compared properly correspond to the same location, as compared to conventional methods that lack alignment to this degree. There, comparisons may be made between non-corresponding areas, lowering the accuracy of identifying documents from fragments of documents. Moreover, as will be described, by comparing pixel regions, and particularly those known to have perturbations, the system may, in some cases, exclude remaining areas of a document from comparison. This not only preserves processing power required to compare documents, such as artifacts to unique copies, but also increases the accuracy of the comparison over conventional methods, since the comparison between the areas without perturbations could end up as noise when determining whether an artifact was derived from a unique copy.

As noted, a comparison of the artifact to the unique copy can be made based on the alignment to determine whether the artifact was derived from the unique copy. This comparison may be performed using region analyzer 130 of FIG. 1. In general, region analyzer 130 compares pixel regions of the unique copy to corresponding pixel regions of the artifact to determine whether the artifact was derived from the unique copy. For instance, region analyzer 130 may compare pixel regions of the unique copy that include one or more perturbations made from the original document.

To determine the pixel regions for comparison, region analyzer 130 may identify the pixel regions within the unique copy from data provided by encoder 110, e.g., region identifier 114, and stored in database 106, as previously described. Region analyzer 130 can determine the pixel regions within an artifact for comparing to the regions in the unique copy based on matching of the alignment as determined by the matching of the keypoints. That is, when aligned, an area (e.g., a pixel region) within the unique copy has a corresponding area within the artifact that is determined from the matching of the keypoints during the alignment.

Figure 11:
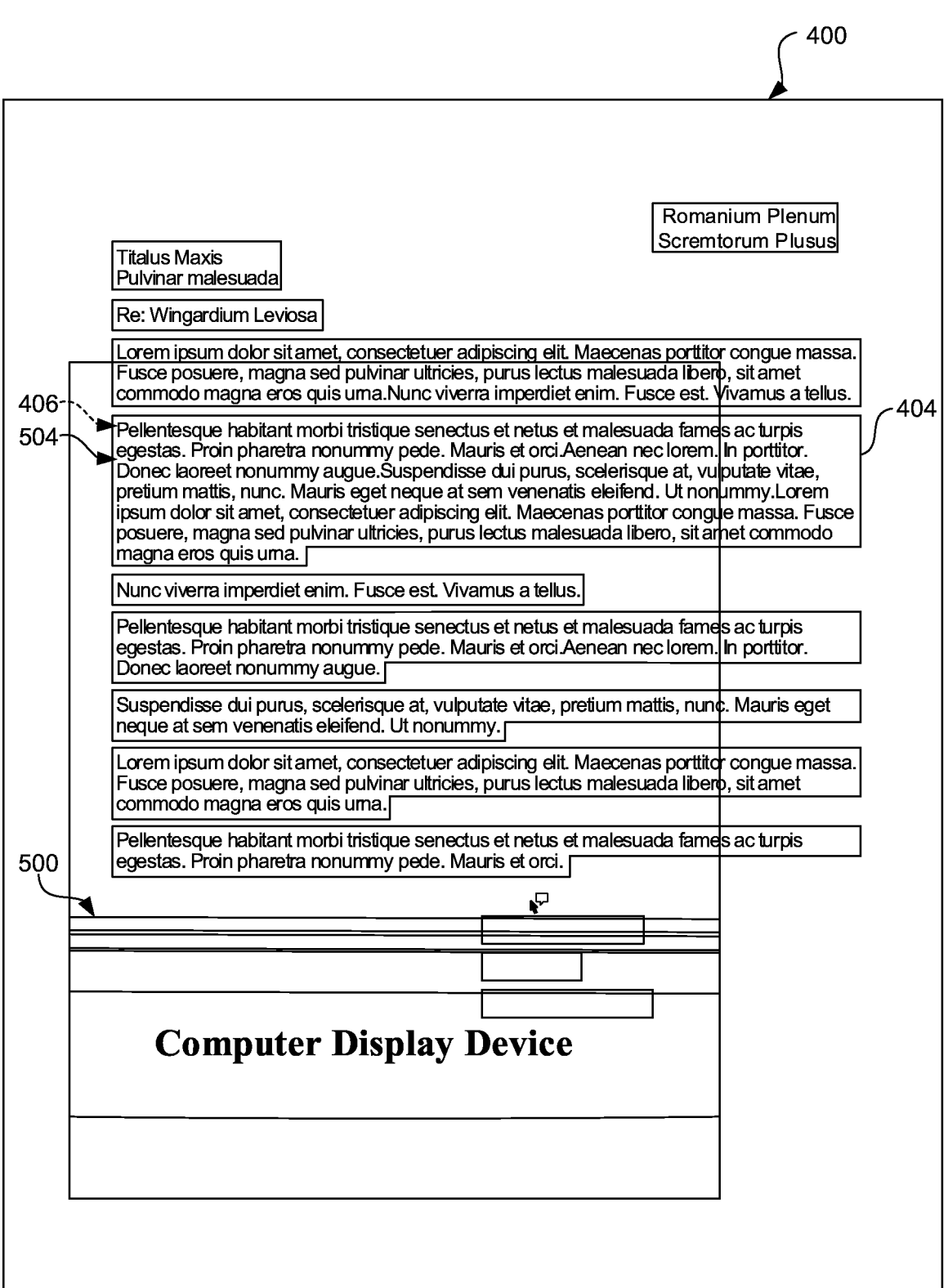
FIG. 11 illustrates the unique copy of FIG. 4 with the bounding boxes of FIG. 5 overlaid with the artifact of FIG. 7, in accordance with an aspect described herein.

FIG. 11 is provided to show an illustrative example of this. FIG. 11 generally illustrates the unique copy of FIG. 4 with the bounding boxes of FIG. 5 overlaid with the artifact of FIG. 7. In essence, the overlay is an illustrated example of the alignment of artifact 500 with unique copy 400 using the keypoint matching, as has been described. Here, the bounding boxes, such as bounding box 404, of unique copy 400 are visible through the overlay. The bounding boxes of unique copy 400, in this example, identify pixel regions within unique copy 400. As illustrated from the overlay in FIG. 11, based on the pixel matching alignment, there are areas within artifact 500 that correspond to the pixel regions of unique copy 400. As an example, first pixel region 406 is a pixel region within unique copy 400 that is identified by bounding box 404. At least a portion of first pixel region 406 has a corresponding area within artifact 500. As illustrated, the corresponding pixel region is shown as second pixel region 504. In this manner, region analyzer 130 can compare areas of unique copy 400 to areas of artifact 500 to determine whether artifact 500 was in fact derived from unique copy 400, such as first pixel region 406 compared to second pixel region 504.

To compare pixel regions between the unique copy and the artifact, region analyzer 130 may use methods similar to those previously described. For instance, region analyzer 130 may convert a feature of the pixels within the pixel regions into vectors in the vector space. This allows for a vector-based comparison between the pixel regions in the artifact with the pixel regions in the unique copies using various sub-image similarity metrics.

Some suitable sub-image similarity metrics can be measured using template matching operations. Some example template matching operations are included in table 1100 illustrated in FIG. 17. Here, R(x,y) is the score (higher is more similar) at pixel offset (x,y), and it can be assumed that x=(0,0), y=(0,0) since the alignment has been computed, e.g., via the pixel matching. T(x',y') is a measure of disagreement between pixels x', y'(e.g., Euclidean distance). M(x',y') is a normalization factor (e.g., the average variance in a pixel neighborhood). In aspects, I can be excluded since alignment through the pixel matching process has taken place. In an aspect, the unique copies can be ranked based on the sub-image similarity metrics for the compared regions, with the highest ranking unique copies having relatively closer matches as determined by the sub-image similarity metrics. In such cases, decoder 122 can identify, e.g., select, the highest ranked unique copy as the unique copy from which the artifact was derived.

Referring back to FIG. 3, pixel regions of artifact 306 are compared to pixel regions in each of unique copies 304 using region analyzer 130. Each unique copy of unique copies 304 can be ranked relative to the other unique copies based on the vector distances between pixels in the compared pixel regions. Based on the ranking, unique copy 308 may be selected as the unique copy from which the artifact was derived. For instance, the highest ranked unique copy of unique copies 304 may be identified as unique copy 308 from which artifact 306 was derived.

Having identified a unique copy from which an artifact was derived, decoder 122 may provide an indication of the unique copy. In an implementation, this is provided to computing device 104 in response to a request having the artifact and a request to identify the unique copy. An indication can be provided in any manner. For instance, the indication may include a copy of the unique copy, an identity of the recipient of the unique copy according to the mapping, a ranking of the unique copies, or a measurement of likelihood that the unique copy is the copy from which the artifact was derived as determined by the vector distances, among other items, or any combination of these.

Figure 12:
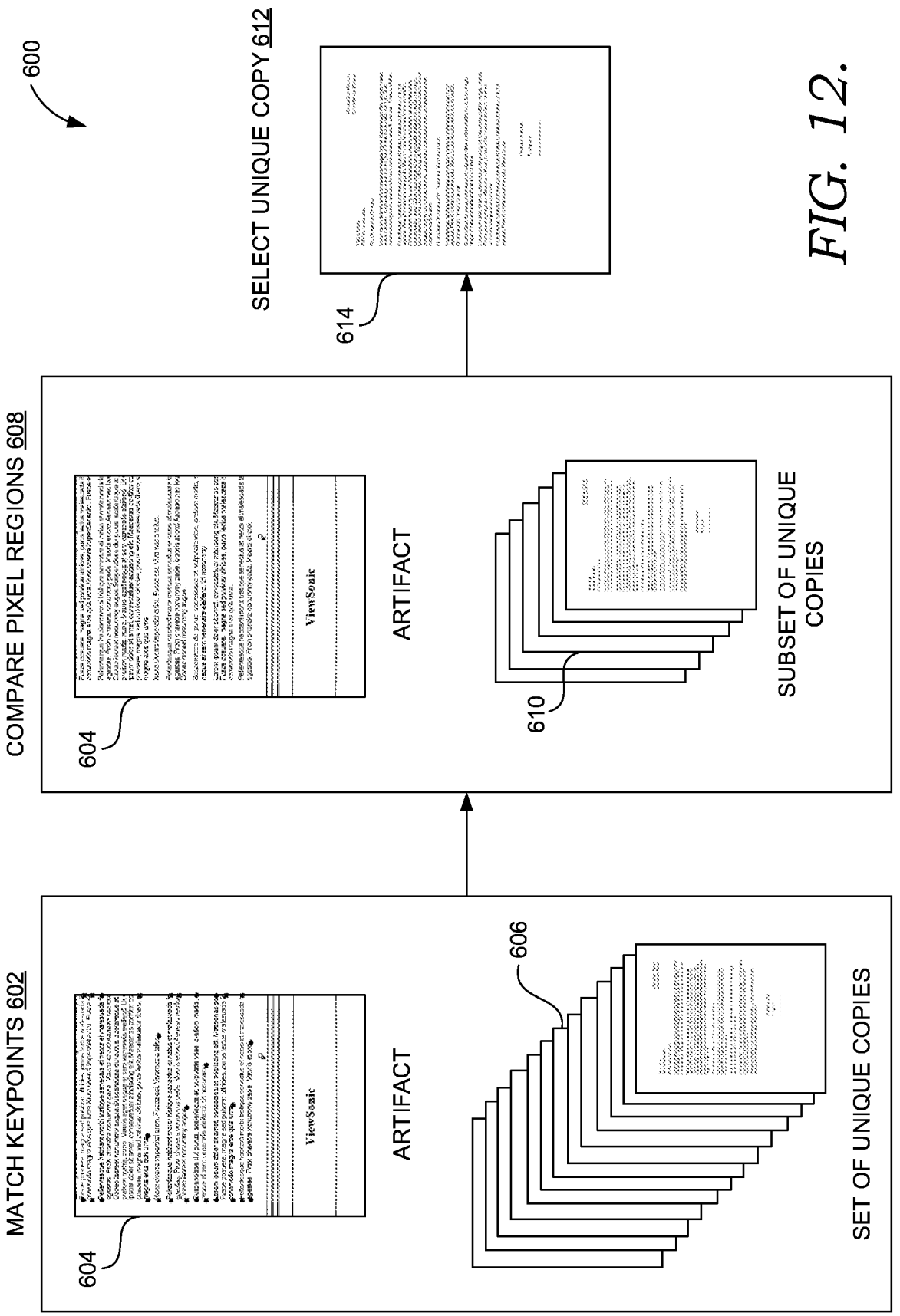
FIG. 12 illustrates an example process of generating a subset of unique copies based on keypoint matching and identifying a unique copy from a subset, in accordance with an aspect described herein.

FIG. 12 illustrates another aspect of the technology that identifies a subset of unique copies when comparing pixel regions. As noted, reducing the number of unique copies that are processed by region analyzer 130 allows for a relatively more computationally efficient mechanism to identify a unique copy.

By way of the illustrated example, process 600 at step 1 602 matches artifact keypoints within artifact 604 to unique copy keypoints in set of unique copies 606. Keypoint identifier 126 can be used to identify the keypoints, while keypoint matcher 128 can be used to match the keypoints. In an implementation, keypoint matcher 128 seeks to match artifact keypoints to unique copy keypoints within each unique copy of set of unique copies 606. As noted, keypoint matcher 128 may match keypoints in the vector space and use a vector distance to determine whether the keypoints match.

A threshold vector distance value can be used to identify unique copies with relatively poor alignment, meaning these unique copies have a low likelihood of being the unique copy from which the artifact was derived. The unique copies of set of unique copies 606 not meeting this threshold vector distance can be removed to generate subset of unique copies 610. As an example, the threshold vector distance may be set so that 50% of the unique copies are below a distance value as determined from matching artifact 604 to each of the copies of set of unique copies 606. In another implementation, the threshold vector distance is set so that 40% of the unique copies are below the distance value. In yet another example, the threshold vector distance is set so that 30% of the unique copies are below the distance value. It will be understood that the threshold vector distance may be set to any value to tune the sensitivity in identifying candidate unique copies for comparison by region analyzer 130.

The greater the number of unique copies removed, the less computational processing that is required when using region analyzer 130 to compare unique copies from subset of unique copies 610; however, the fewer number of unique copies removed, the more robust the detection may become in some example implementations of the technology.

Having generated subset of unique copies 610, at step 2 608 pixel regions are compared between each unique copy of subset of unique copies 610 and artifact 604. This can be done using region analyzer 130 as previously described. From subset of unique copies 610, and based on the comparison of pixel regions by region analyzer 130, unique copy 614 is identified at step 3 612 as the unique copy of the unique copies within set of unique copies 606 from which artifact 604 was derived.

With reference now to FIGS. 13-15, block diagrams are provided respectively illustrating methods 700, 800, and 900 for identifying a unique copy from which an artifact was derived. Each block of methods 700, 800, and 900 may comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few possibilities. Methods 700, 800, and 900 may be implemented in whole or in part by components of operating environment 100, such as encoder 110 and decoder 122 in any combination or order.

Turning specifically now to FIG. 13, method 700 is provided to illustrate one example of identifying a unique copy from an artifact. At block 702, an artifact is received. The artifact received has been derived from a unique copy of an original document, in which the unique copy includes one or more perturbations made from the original document. The unique copy may be one of a set of unique copies that includes a plurality of unique copies, each unique copy of the set being unique based on variations in the perturbations made from the original document.

At block 704, artifact keypoints are identified in the artifact. To do so, keypoint model 118 may be employed by keypoint identifier 126. As noted, keypoint identifier 126 may identify one or more robust features associated with the content of the artifact, such as corner locations, and associate these as keypoints. At block 706, the artifact keypoints are matched to the unique copy keypoints. The unique copy keypoints may be identified during an offline process and stored as data or metadata with the unique copies. In another example, the unique copy keypoints are generated at runtime subsequent to receiving the artifact. The keypoints can be matched using keypoint matcher 128, e.g., using their respective pixel neighborhoods. This may be done by vectorizing a feature of the pixels within the pixel neighborhoods, such as pixel intensity gradient. The matching aligns the artifact to the unique copy at a location from which it was likely derived. In some implementations, a rigid transformation is applied when matching the keypoints so as to limit an orientation of the artifact relative to the unique copy.

At block 708, pixels from a first pixel region of the unique copy are compared with pixels of a second pixel region of the artifact. As noted, region identifier 114 may be used to identify pixel regions within the unique copy. One example method uses bounding boxes to identify the pixel regions in the unique copy, such as the first pixel region. In one particular example, the pixel region within the unique copy is identified based on the pixel region comprising a perturbation from the original document. The second pixel region of the artifact may be determined from an area within the artifact that corresponds to the first pixel region of the unique copy based on matching the keypoints, e.g., aligning the artifact to the unique copy.

In an aspect of the technology, the comparison at block 708 is performed on a subset of unique copies selected from the set of unique copies. As noted, based on matching the keypoints at block 706, a portion of the unique copies satisfying a threshold vector distance may be selected for inclusion in the subset.

At block 710, an indication is output that the artifact was derived from the unique copy. The indication may be output by decoder 122, for example. The indication may be output in response to identifying the artifact was derived from the unique copy based on the comparison performed at block 708.

Referring now to FIG. 14, another example method 800 for identifying a unique copy is provided. At block 802, a set of unique copies of an original document is generated. For instance, the set of unique copies may be generated using encoder 110. The set of unique copies may include a plurality set of unique copies that each comprise a unique variation of one or more perturbations made from the original document.

At block 804, unique copy keypoints may be identified within the unique copies of the set of unique copies. This may be done using keypoint identifier 126. For instance, keypoints may be associated with content features identified by keypoint model 118 based on its training, such as corner locations within the unique copies created by content.

At block 806, pixel regions are identified within the unique copies. This may be done using region identifier 114. In aspects, the pixel regions are identified based on whether the pixel region comprises a perturbation from the original document created when generating the unique copy, such as those generated by document marker 112. In an aspect, the pixel regions are identified from a bounding box.

At block 808, it is determined that an artifact is derived from a unique copy of the unique copies. To identify the artifact, artifact keypoints are matched to the unique copy keypoints. The artifact keypoints may be generated using keypoint identifier 126. The matching maybe done in the vector space using keypoint matcher 128 by determining the distance between vectors representing pixels within pixel neighborhoods of the artifact keypoints and pixels within pixel neighborhoods of the unique copy keypoints. Rigid transformation may be applied to restrict an orientation of the artifact relative to the unique copy when matching the keypoints.

In an implementation, a subset of unique copies is selected based on matching the keypoints. For instance, a portion of the unique copies satisfying a threshold vector distance may be selected for the subset.

A first pixel region within the unique copy can be compared to a second pixel region in the artifact that corresponds to the first pixel region, which is determined based on the matching. The unique copy may be selected from the set of unique copies or the subset of unique copies based on comparing pixel regions of the unique copies to corresponding pixel regions of the artifact. Based on the comparison of the pixels in the first pixel region to the pixels in the second pixel region, a determination is made by region analyzer 130 that the artifact is derived from the unique copy. Vectors may be generated using pixel features, such as pixel intensity gradient. At block 810, an indication that the artifact is derived from the unique copy is output.

FIG. 15 illustrates another example method 900 for identifying a unique copy. At block 902, artifact keypoints are matched to unique copy keypoints. The artifact keypoints are identified within an artifact. The artifact is derived from a unique copy. The unique copy keypoints are identified within the unique copy. Artifact keypoints can be matched to unique copy keypoints using keypoint matcher 128. The keypoints may be matched using pixel neighborhoods at least partially surrounding the keypoints. As noted, pixels within these pixel neighborhoods can be compared in the vector space based on a vectorized feature or features of the pixels. In a particular example, the vectorized features can be a pixel intensity gradient. A rigid transformation may be performed as part of the matching process.

Keypoint identifier 126 can be used to identify the artifact keypoints and the unique copy keypoints. As noted, in one example, a feature of the content, such as corner locations, is identified by keypoint identifier 126, and the identified features are associated as keypoints.

At block 904, a first pixel region is identified in the unique copy. The first pixel region may be identified using region identifier 114, for instance. In an aspect, the first pixel region is identified by a bounding box generated by region identifier 114. The first pixel region may comprise content within the unique copy in which a perturbation has been made from the original document.

At block 906, a second pixel region in the artifact is identified. The second pixel region may be identified using region analyzer 130. The second pixel region is identified based on the second pixel region having a location within the artifact that corresponds to the first pixel region within the unique copy, as determined by the matching at block 902. Put another way, the second pixel region may be identified based on the pixels of the second pixel region having a location within the artifact that corresponds to the first pixel region of the unique copy based on the matching.

At block 908, an indication that the artifact was derived from the unique copy is output. The determination that the artifact was derived by the unique copy may be done based on comparing pixels of the first pixel region and pixels of the second pixel region at block 906. The output indication may be responsive to the determination.

Figure 16:
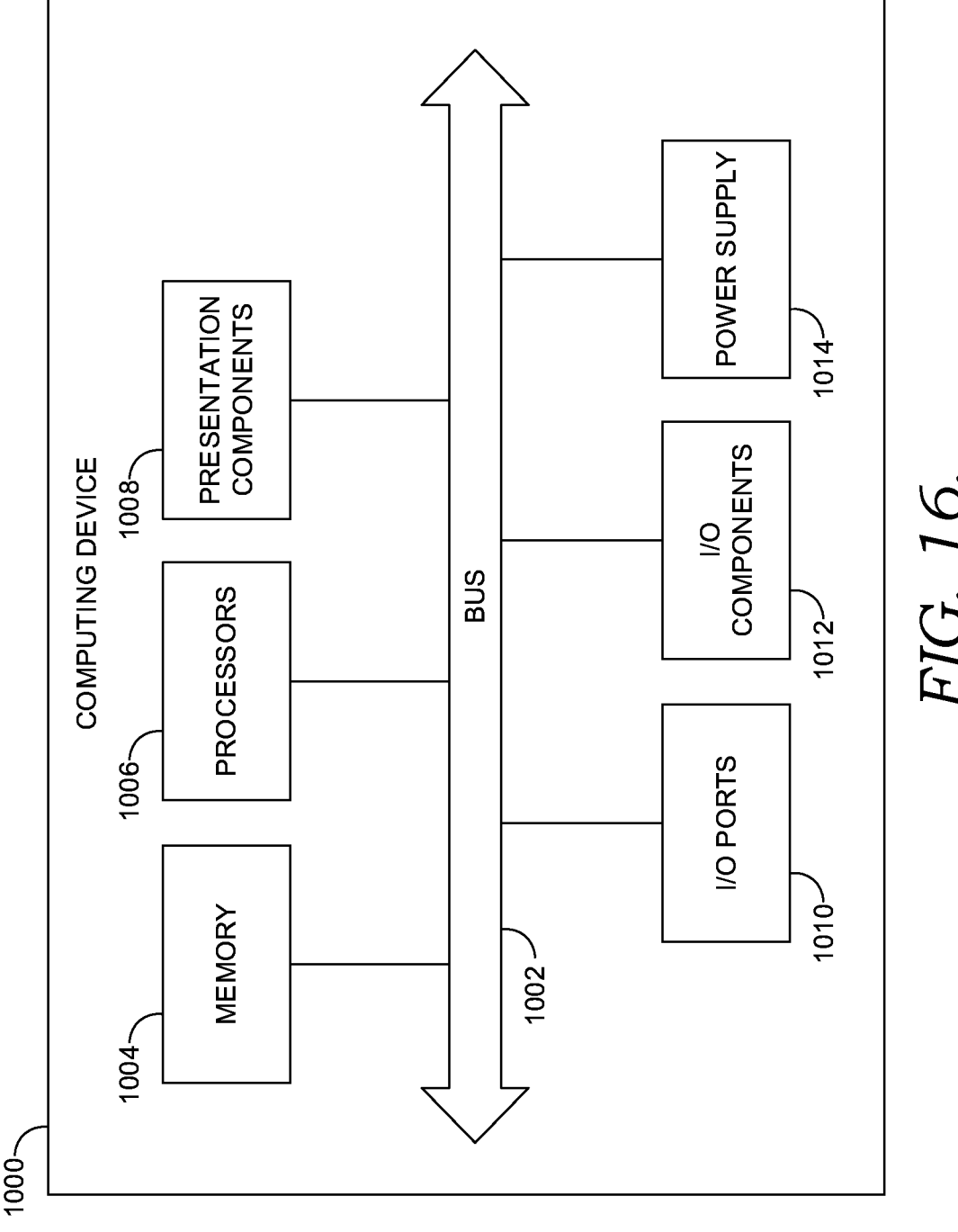
FIG. 16 illustrates an example computing device in which aspects of the technology may be employed, in accordance with an aspect described herein.

Having described an overview of some embodiments of the present technology, an example computing environment in which embodiments of the present technology may be implemented is described below in order to provide a general context for various aspects of the present technology. Referring now to FIG. 16 in particular, an example operating environment for implementing embodiments of the present technology is shown and designated generally as computing device 1000. Computing device 1000 is but one example of a suitable computing environment and is not intended to suggest any limitation as to the scope of use or functionality of the technology. Computing device 1000 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference still to FIG. 16, computing device 1000 includes bus 1002, which directly or indirectly couples the following devices: memory 1004, one or more processors 1006, one or more presentation components 1008, input/output (I/O) ports 1010, input/output components 1012, and illustrative power supply 1014. Bus 1002 represents what may be one or more buses (such as an address bus, data bus, or combination thereof). Although the various blocks of FIG. 16 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 16 is merely illustrative of an example computing device that can be used in connection with one or more embodiments of the present technology. Distinction is not made between such categories as "workstation," "server," "laptop," "hand-held device," etc., as all are contemplated within the scope of FIG. 16 and with reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media, also referred to as a communication component, includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and that can be accessed by computing device 1000. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 1004 includes computer-storage media in the form of volatile or nonvolatile memory. The memory may be removable, non-removable, or a combination thereof. Example hardware devices include solid-state memory, hard drives, optical-disc drives, etc. Computing device 1000 includes one or more processors that read data from various entities, such as memory 1004 or I/O components 1012. Presentation component(s) 1008 presents data indications to a user or other device. Example presentation components include a display device, speaker, printing component, vibrating component, etc.

I/O ports 1010 allow computing device 1000 to be logically coupled to other devices, including I/O components 1012, some of which may be built in. Illustrative components include a microphone, joystick, game pad, satellite dish, scanner, printer, wireless device, etc. The I/O components 1012 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, or gesture recognition, both on screen and adjacent to the screen, as well as air gestures, head and eye tracking, or touch recognition associated with a display of computing device 1000. Computing device 1000 may be equipped with depth cameras, such as stereoscopic camera systems, infrared camera systems, RGB (red-green-blue) camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of computing device 1000 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions include any software, including low-level software written in machine code; higher level software, such as application software; and any combination thereof. In this regard, components for identifying a unique copy can manage resources and provide the described functionality. Any other variations and combinations thereof are contemplated within embodiments of the present technology.

With reference briefly back to FIG. 1, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to encoder 110 and decoder 122, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as database 106. Moreover, functions of encoder 110 and decoder 122, among other functions, may be performed by server 102, computing device 104, or any other component, in any combination. It is again emphasized that the functions performed by encoder 110 and decoder 122 are an example, and in other aspects of the technology, these functions may be performed by other components in any order or combination.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the words "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving," or "transmitting," as facilitated by software or "hardware-based buses, receivers, or transmitters" using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment. However, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

Some example aspects that can be practiced from the forgoing description include the following:

Aspect 1: A system comprising: at least one processor; and one or more computer storage media storing computer-readable instructions thereon that when executed by the at least one processor cause the at least one processor to perform operations comprising: receiving an artifact derived from a unique copy of an original document; identifying artifact keypoints within the artifact; matching the artifact keypoints to unique copy keypoints within the unique copy; comparing a first pixel region of the unique copy with a second pixel region of the artifact, the second pixel region of the artifact being located within an area of the artifact that corresponds to the first pixel region in the unique copy, the second pixel region of the artifact being determined from matching the artifact keypoints to the unique copy keypoints; and outputting an indication that the artifact was derived from the unique copy based on comparing the pixels of the first pixel region with the pixels of the second pixel region.

Aspect 2: Aspect 1, wherein identifying artifact keypoints comprises: identifying corner locations formed by content within the artifact; and associating the identified corner locations of the artifact as the artifact keypoints.

Aspect 3: Any of Aspects 1-2, wherein matching the artifact keypoints to the unique copy keypoints comprises: identifying pixel neighborhoods comprising pixels surrounding the artifact keypoints and the unique copy keypoints; and vectorizing a feature of the pixels in the pixel neighborhoods, wherein the artifact keypoints are matched to the unique copy keypoints based on a vector distance between feature vectors of the pixels within the pixel neighborhoods of the artifact keypoints and feature vectors of the pixels within the pixel neighborhoods of the unique copy keypoints.

Aspect 4: Aspect 3, wherein the vectorized feature comprises a pixel intensity gradient.

Aspect 5: Any of Aspects 1-4, further comprising performing a rigid transformation to limit an orientation of the artifact relative to the unique copy, wherein the matching is based on the rigid transformation.

Aspect 6: Any of Aspects 1-5, wherein the unique copy is included as part of a set of unique copies derived from the original document, and the operations further comprise: selecting a subset of unique copies from the set of unique copies based on matching the artifact keypoints to the unique copy keypoints; comparing pixel regions of each unique copy in the subset with the pixel regions of the artifact; and selecting the unique copy from the unique copies within the subset based on comparing the first pixel region with the second pixel region, wherein the indication is output in response to selecting the unique copy.

Aspect 7: Any of Aspects 1-6, wherein the first pixel region of the unique copy is identified by a bounding box of an area in the unique copy comprising a perturbation made from the original document.

Aspect 8: A method performed by one or more processors, the method comprising: generating a set of unique copies of an original document; identifying unique copy keypoints in the unique copies of the set of unique copies; identifying pixel regions of pixels within the unique copies, the pixel regions comprising perturbations made from the original document; determining an artifact is derived from a unique copy of the set of unique copies based on artifact keypoints matching the unique copy keypoints of the unique copy and a comparison of a first pixel region of the unique copy to a second pixel region of the artifact, the second pixel region of the artifact corresponding in location to the first pixel region in the unique copy; and outputting an indication that the artifact is derived from the unique copy.

Aspect 9: Aspect 8, wherein identifying unique copy keypoints comprises:

identifying corner locations formed by content within the unique copies; and associating the identified corner locations of the unique copies as the unique copy keypoints.

Aspect 10: Any of Aspects 8-9, further comprising: identifying pixel neighborhoods comprising pixels surrounding the unique copy keypoints and the artifact keypoints; vectorizing a feature of the pixels in the pixel neighborhoods; and matching the artifact keypoints to the unique copy keypoints based on a vector distance between feature vectors of the pixels within the pixel neighborhoods of the artifact keypoints and feature vectors of the pixels within the pixel neighborhoods of the unique copy keypoints.

Aspect 11: Aspect 10, wherein the vectorized feature comprises a pixel intensity gradient.

Aspect 12: Any of Aspects 10-11, further comprising performing a rigid transformation to limit an orientation of the artifact relative to the unique copy, wherein the matching is based on the rigid transformation.

Aspect 13: Any of Aspects 10-12, further comprising: selecting a subset of unique copies from the set of unique copies based on matching the artifact keypoints to the unique copy keypoints; comparing pixel regions of each unique copy in the subset with pixel regions of the artifact; and selecting the unique copy from the unique copies within the subset based on comparing the first pixel region with the second pixel region, wherein the indication is output in response to selecting the unique copy.

Aspect 14: Any of Aspects 8-13, wherein the first pixel region of the unique copy is identified by a bounding box of an area in the unique copy comprising a perturbation made from the original document.

Aspect 15: One or more computer storage media storing computer readable instructions thereon that, when executed by a processor, cause the processor to perform a method comprising: matching artifact keypoints to unique copy keypoints, the artifact keypoints identified in an artifact derived from a unique copy of an original document, the unique copy keypoints identified in the unique copy; identifying a first pixel region of pixels in the unique copy, the first pixel region comprising a perturbation made from the original document; identifying a second pixel region of pixels in the artifact, the second pixel region identified based on the pixels of the second pixel region having a location within the artifact that corresponds to the first pixel region of the unique copy based on matching the artifact keypoints to the unique copy keypoints; and outputting an indication that the artifact was derived from the unique copy based on the first pixel region compared to the second pixel region.

Aspect 16: Aspect 15, further comprising identifying the artifact keypoints and the unique copy keypoints, the artifact keypoints and the unique copy keypoints identified by: identifying corner locations formed by content within the unique copy and the artifact; associating the identified corner locations of the artifact as the artifact keypoints; and associating the identified corner locations of the unique copy as the unique copy keypoints.

Aspect 17: Any of Aspects 15-16, wherein matching the artifact keypoints to the unique copy keypoints comprises: identifying pixel neighborhoods comprising pixels surrounding the artifact keypoints and the unique copy keypoints; and vectorizing a feature of the pixels in the pixel neighborhoods, wherein the artifact keypoints are matched to the unique copy keypoints based on a vector distance between feature vectors of the pixels within the pixel neighborhoods of the artifact keypoints and feature vectors of the pixels within the pixel neighborhoods of the unique copy keypoints.

Aspect 18: Aspect 17, wherein the vectorized feature comprises a pixel intensity gradient.

Aspect 19: Any of Aspects 15-18, further comprising performing a rigid transformation to limit an orientation of the artifact relative to the unique copy, wherein the matching is based on the rigid transformation.

Aspect 20: Any of Aspects 15-19, wherein the first pixel region of the unique copy is identified by a bounding box of an area in the unique copy comprising the perturbation made from the original document.

What is claimed is:

1. A system comprising:
at least one processor; and
one or more computer storage media storing computer-readable instructions thereon that when executed by the at least one processor cause the at least one processor to perform operations comprising:
receiving an artifact derived from a unique copy of an original document;
identifying artifact keypoints within the artifact, the artifact keypoints being identified for features that are reproduced between the artifact and the unique copy;
matching the artifact keypoints to unique copy keypoints within the unique copy;
comparing a first pixel region of the unique copy with a second pixel region of the artifact, the second pixel region of the artifact being located within an area of the artifact that corresponds to the first pixel region in the unique copy, the second pixel region of the artifact being determined from matching the artifact keypoints to the unique copy keypoints; and
outputting an indication that the artifact was derived from the unique copy based on comparing the pixels of the first pixel region with the pixels of the second pixel region.

2. The system of claim 1, wherein identifying artifact keypoints comprises:
identifying corner locations formed by content within the artifact; and
associating the identified corner locations of the artifact as the artifact keypoints.

3. The system of claim 1, wherein matching the artifact keypoints to the unique copy keypoints comprises:
identifying pixel neighborhoods comprising pixels surrounding the artifact keypoints and the unique copy keypoints; and
vectorizing a feature of the pixels in the pixel neighborhoods, wherein the artifact keypoints are matched to the unique copy keypoints based on a vector distance between feature vectors of the pixels within the pixel neighborhoods of the artifact keypoints and feature vectors of the pixels within the pixel neighborhoods of the unique copy keypoints.

4. The system of claim 3, wherein the vectorized feature comprises a pixel intensity gradient.

5. The system of claim 1, further comprising performing a rigid transformation to limit an orientation of the artifact relative to the unique copy, wherein the matching is based on the rigid transformation.

6. The system of claim 1, wherein the unique copy is included as part of a set of unique copies derived from the original document, and the operations further comprise:
selecting a subset of unique copies from the set of unique copies based on matching the artifact keypoints to the unique copy keypoints;
comparing pixel regions of each unique copy in the subset with corresponding pixel regions of the artifact; and
selecting the unique copy from the unique copies within the subset based on comparing the first pixel region with the second pixel region, wherein the indication is output in response to selecting the unique copy.

7. The system of claim 1, wherein the first pixel region of the unique copy is identified by a bounding box of an area in the unique copy comprising a perturbation made from the original document.

8. A method performed by one or more processors, the method comprising:
generating a set of unique copies of an original document;
identifying unique copy keypoints in the unique copies of the set of unique copies;
identifying pixel regions of pixels within the unique copies, the pixel regions comprising perturbations made from the original document;
determining an artifact is derived from a unique copy of the set of unique copies based on artifact keypoints matching the unique copy keypoints of the unique copy and a comparison of a first pixel region of the unique copy to a second pixel region of the artifact, the second pixel region of the artifact corresponding in location to the first pixel region in the unique copy, wherein the artifact keypoints correspond to features that are reproduced between the artifact and the unique copy; and
outputting an indication that the artifact is derived from the unique copy.

9. The method of claim 8, wherein identifying unique copy keypoints comprises:
identifying corner locations formed by content within the unique copies; and
associating the identified corner locations of the unique copies as the unique copy keypoints.

10. The method of claim 8, further comprising:
identifying pixel neighborhoods comprising pixels surrounding the unique copy keypoints and the artifact keypoints;
vectorizing a feature of the pixels in the pixel neighborhoods; and
matching the artifact keypoints to the unique copy keypoints based on a vector distance between feature vectors of the pixels within the pixel neighborhoods of the artifact keypoints and feature vectors of the pixels within the pixel neighborhoods of the unique copy keypoints.

11. The method of claim 10, wherein the vectorized feature comprises a pixel intensity gradient.

12. The method of claim 10, further comprising performing a rigid transformation to limit an orientation of the artifact relative to the unique copy, wherein the matching is based on the rigid transformation.

13. The method of claim 10, further comprising:

selecting a subset of unique copies from the set of unique copies based on matching the artifact keypoints to the unique copy keypoints;

comparing pixel regions of each unique copy in the subset with pixel regions of the artifact; and selecting the unique copy from the unique copies within the subset based on comparing the first pixel region with the second pixel region, wherein the indication is output in response to selecting the unique copy.

14. The method of claim 8, wherein the first pixel region of the unique copy is identified by a bounding box of an area in the unique copy comprising a perturbation made from the original document.

15. One or more computer storage media storing computer readable instructions thereon that, when executed by a processor, cause the processor to perform a method comprising:

matching artifact keypoints to unique copy keypoints, the artifact keypoints identified in an artifact derived from a unique copy of an original document, the artifact keypoints corresponding to features that are reproduced between the artifact and the unique copy, the unique copy keypoints identified in the unique copy;

identifying a first pixel region of pixels in the unique copy, the first pixel region comprising a perturbation made from the original document;

identifying a second pixel region of pixels in the artifact, the second pixel region identified based on the pixels of the second pixel region having a location within the artifact that corresponds to the first pixel region of the unique copy based on matching the artifact keypoints to the unique copy keypoints; and outputting an indication that the artifact was derived from the unique copy based on the first pixel region compared to the second pixel region.

16. The media of claim 15, further comprising identifying the artifact keypoints and the unique copy keypoints, the artifact keypoints and the unique copy keypoints identified by:

identifying corner locations formed by content within the unique copy and the artifact;

associating the identified corner locations of the artifact as the artifact keypoints; and associating the identified corner locations of the unique copy as the unique copy keypoints.

17. The media of claim 15, wherein matching the artifact keypoints to the unique copy keypoints comprises:

identifying pixel neighborhoods comprising pixels surrounding the artifact keypoints and the unique copy keypoints; and vectorizing a feature of the pixels in the pixel neighborhoods, wherein the artifact keypoints are matched to the unique copy keypoints based on a vector distance between feature vectors of the pixels within the pixel neighborhoods of the artifact keypoints and feature vectors of the pixels within the pixel neighborhoods of the unique copy keypoints.

18. The media of claim 17, wherein the vectorized feature comprises a pixel intensity gradient.

19. The media of claim 15, further comprising performing a rigid transformation to limit an orientation of the artifact relative to the unique copy, wherein the matching is based on the rigid transformation.

20. The media of claim 15, wherein the first pixel region of the unique copy is identified by a bounding box of an area in the unique copy comprising the perturbation made from the original document.

* * * * *